(12) United States Patent
Vobbilisetty et al.

(10) Patent No.: US 9,716,672 B2
(45) Date of Patent: Jul. 25, 2017

(54) DISTRIBUTED CONFIGURATION MANAGEMENT FOR VIRTUAL CLUSTER SWITCHING

(75) Inventors: Suresh Vobbilisetty, San Jose, CA (US); Shiv Haris, Palo Alto, CA (US); Phanidhar Koganti, Sunnyvale, CA (US); Vidyasagara R. Guntaka, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 175 days.

(21) Appl. No.: 13/092,580

(22) Filed: Apr. 22, 2011

(65) Prior Publication Data

US 2011/0292947 A1    Dec. 1, 2011

Related U.S. Application Data

(60) Provisional application No. 61/349,603, filed on May 28, 2010, provisional application No. 61/380,818, filed on Sep. 8, 2010.

(51) Int. Cl.
*H04L 12/54* (2013.01)
*H04L 12/931* (2013.01)

(52) U.S. Cl.
CPC .................................. *H04L 49/70* (2013.01)

(58) Field of Classification Search
CPC ...... H04L 12/4641; H04L 45/54; H04L 49/70
USPC .................................................. 370/397, 409
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrli, III |
| 5,983,278 A | 11/1999 | Chong |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

"Switched Virtual Internetworking moved beyond bridges and routers", 8178 Data Communications Sep. 23, 1994, No. 12, New York.

(Continued)

*Primary Examiner* — Shaq Taha
*Assistant Examiner* — Ryan Kavleski
(74) *Attorney, Agent, or Firm* — Shun Yao; Park, Vaughan, Fleming & Dowler LLP

(57) ABSTRACT

One embodiment of the present invention provides a switch. The switch includes a port to couple to a second switch. The switch also includes a control mechanism configured to maintain a set of configuration information for a virtual cluster switch which includes a number of member switches. The set of configuration information includes global configuration information for the virtual cluster switch and switch-specific configuration information for one or more member switches. In addition, the set of configuration information is replicated and stored at each member switch.

20 Claims, 14 Drawing Sheets

(56) References Cited

U.S. PATENT DOCUMENTS

| | | | |
|---|---|---|---|
| 5,995,262 A | 11/1999 | Hirota | |
| 6,041,042 A | 3/2000 | Bussiere | |
| 6,085,238 A | 7/2000 | Yuasa | |
| 6,092,062 A * | 7/2000 | Lohman | G06F 17/30463 |
| 6,104,696 A | 8/2000 | Kadambi | |
| 6,185,214 B1 | 2/2001 | Schwartz | |
| 6,185,241 B1 | 2/2001 | Sun | |
| 6,295,527 B1 | 9/2001 | McCormack | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Phillips | |
| 6,553,029 B1 | 4/2003 | Alexander | |
| 6,571,355 B1 | 5/2003 | Linnell | |
| 6,583,902 B1 | 6/2003 | Yuen | |
| 6,633,761 B1 | 10/2003 | Singhal | |
| 6,636,963 B1 | 10/2003 | Stein | |
| 6,771,610 B1 | 8/2004 | Seaman | |
| 6,870,840 B1 | 3/2005 | Hill | |
| 6,873,602 B1 | 3/2005 | Ambe | |
| 6,937,576 B1 | 8/2005 | DiBenedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,062,177 B1 | 6/2006 | Grivna | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser, Jr. | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,801,021 B1 | 9/2010 | Triantafillis | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,438 B1 | 5/2011 | Miller | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 | 1/2012 | Chawla | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake, III | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 | 5/2013 | Venkataraman | |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 | 12/2013 | Natarajan | |
| 8,619,788 B1 | 12/2013 | Sankaran | |
| 8,705,526 B1 | 4/2014 | Hasan | |
| 8,706,905 B1 | 4/2014 | McGlaughlin | |
| 8,717,895 B2 | 5/2014 | Koponen | |
| 8,724,456 B1 | 5/2014 | Hong | |
| 8,798,045 B1 | 8/2014 | Aybay | |
| 8,804,736 B1 | 8/2014 | Drake | |
| 8,806,031 B1 | 8/2014 | Kondur | |
| 8,826,385 B2 | 9/2014 | Congdon | |
| 8,918,631 B1 * | 12/2014 | Kumar | H04L 12/4641 370/254 |
| 8,937,865 B1 | 1/2015 | Kumar | |
| 8,995,272 B2 | 3/2015 | Agarwal | |
| 9,178,793 B1 | 11/2015 | Marlow | |
| 9,350,680 B2 | 5/2016 | Thayalan | |
| 9,438,447 B2 | 9/2016 | Basso | |
| 2001/0005527 A1 | 6/2001 | Vaeth | |
| 2001/0055274 A1 | 12/2001 | Hegge | |
| 2002/0019904 A1 | 2/2002 | Katz | |
| 2002/0021701 A1 | 2/2002 | Lavian | |
| 2002/0039350 A1 | 4/2002 | Wang | |
| 2002/0054593 A1 | 5/2002 | Morohashi | |
| 2002/0087723 A1 | 7/2002 | Williams | |
| 2002/0091795 A1 | 7/2002 | Yip | |
| 2002/0124107 A1 * | 9/2002 | Goodwin | 709/242 |
| 2003/0026290 A1 | 2/2003 | Umayabashi | |
| 2003/0041085 A1 | 2/2003 | Sato | |
| 2003/0093567 A1 | 5/2003 | Lolayekar | |
| 2003/0097464 A1 | 5/2003 | Martinez | |
| 2003/0097470 A1 | 5/2003 | Lapuh | |
| 2003/0123393 A1 | 7/2003 | Feuerstraeter | |
| 2003/0147385 A1 | 8/2003 | Montalvo | |
| 2003/0174706 A1 | 9/2003 | Shankar | |
| 2003/0189905 A1 | 10/2003 | Lee | |
| 2003/0189930 A1 | 10/2003 | Terrell | |
| 2003/0208616 A1 | 11/2003 | Laing | |
| 2003/0216143 A1 | 11/2003 | Roese | |
| 2003/0223428 A1 | 12/2003 | BlanquerGonzalez | |
| 2003/0233534 A1 | 12/2003 | Bernhard | |
| 2004/0001433 A1 | 1/2004 | Gram | |
| 2004/0003094 A1 | 1/2004 | See | |
| 2004/0008868 A1 | 1/2004 | Bornowski | |
| 2004/0010600 A1 | 1/2004 | Baldwin | |

(56) References Cited

U.S. PATENT DOCUMENTS

| | | |
|---|---|---|
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1* | 2/2006 | Perera et al. ............... 370/386 |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0288020 A1* | 12/2006 | Awad ............... G06F 17/30961 |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1* | 2/2009 | Gai et al. ............... 726/1 |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1* | 4/2009 | Lapuh et al. ............... 370/228 |
| 2009/0094354 A1* | 4/2009 | Rastogi ............... H04L 41/0816 709/221 |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |

(56) References Cited

U.S. PATENT DOCUMENTS

| | | |
|---|---|---|
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1* | 11/2009 | Lambeth et al. ............ 711/6 |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukia |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |

(56) References Cited

U.S. PATENT DOCUMENTS

| | | |
|---|---|---|
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320749 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0157251 A1 | 6/2014 | Hocker |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0172098 A1 | 6/2015 | Agarwal |
| 2015/0195093 A1 | 7/2015 | Mahadevan |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 12/2008 |
| EP | 2874359 | 5/2015 |
| WO | 2008056838 | 5/2008 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2014031781 | 2/2014 |

OTHER PUBLICATIONS

S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
Eastlake 3rd., Donald et al., "RBridges: TRILL Header Options", Draft-ietf-trill-rbridge-options-00.txt Dec. 24, 2009.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 13, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.

(56) References Cited

OTHER PUBLICATIONS

U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 15, 2012.
U.S. Appl. No. 12/725,249 Office Action dated Apr. 26, 2013.
U.S. Appl. No. 12/725,249 Office Action dated Sep. 12, 2012.
Brocade Fabric OS (FOS) 6.2 Virtual Fabrics Feature Frequently Asked Questions, 2009.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", BROCADE white paper, http://community.brocade.com/docs/Doc-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
U.S. Appl. No. 13/044,326 Office Action dated Oct. 2, 2013.
Office Action for U.S. Appl. No. 13/533,843, filed Jun. 26, 2012, dated Oct. 21, 2013.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/598,204, filed Aug. 29, 2012, dated Feb. 20, 2014.
Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/092,752, filed Apr. 22, 2011, dated Apr. 9, 2014.
Office Action for U.S. Appl. No. 13/092,701, dated Mar. 26, 2014.
Office Action for U.S. Appl. No. 13/092,460, filed Apr. 22, 2011, dated Mar. 14, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.
Office Action for 13/425,238, filed Mar. 20, 2012, dated Mar. 6, 2014.
Office action dated Aug. 29, 2014, U.S. Appl. No. 13/042,259, filed Mar. 7, 2011.
'RBridges: Base Protocol Specification', IETF Draft, Perlman et al., Jun. 26, 2009.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office Action for 13/365,993, filed Feb. 3, 2012, from Cho, Hong Sol., dated Jul. 23, 2013.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office action dated Jan. 6, 2014, U.S. Appl. No. 13/092,877, filed Apr. 22, 2011.

(56) References Cited

OTHER PUBLICATIONS

Office Action for U.S. Appl. No. 13/042,259, filed Mar. 7, 2011, from Jaroenchonwanit, Bunjob, dated Jan. 16, 2014.
Lapuh, Roger et al., 'Split Multi-link Trunking (SMLT) draft-lapuh-network-smlt-08', Jan. 2009.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated Aug. 21, 2014, U.S. Appl. No. 13/184,526, filed Jul. 16, 2011.
Office action dated Aug. 4, 2014, U.S. Appl. No. 13/050,102, filed Mar. 17, 2011.
Office Action for U.S. Appl. No. 13/030,806, filed Feb. 18, 2011, dated Dec. 3, 2012.
Office Action for U.S. Appl. No. 13/312,903, filed Dec. 6, 2011, dated Jun. 13, 2013.
TRILL Working Group Internet-Draft Intended status: Proposed Standard RBridges: Base Protocol Specificaiton Mar. 3, 2010.
Office Action for U.S. Appl. No. 13/742,207, filed Jan. 15, 2013.
Office Action for U.S. Appl. No. 13/351,513, filed Jan. 17, 2012, dated Jul. 24, 2014.
Office Action for U.S. Appl. No. 13/087,239, filed Apr. 14, 2011, dated Dec. 5, 2012.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/556,061, filed Jul. 23, 2012, dated Jun. 6, 2014.
Office Action for U.S. Appl. No. 13/092,877, filed Apr. 22, 2011, dated Jun. 20, 2014.
Office Action for U.S. Appl. No. 13/092,873, filed Apr. 22, 2011, dated Jul. 25, 2014.
Office Action for U.S. Appl. No. 13/312,903, filed Dec. 6, 2011, dated Aug. 7, 2014.
Brocade 'An Introduction to Brocade VCS Fabric Technology', Dec. 3, 2012.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office Action for U.S. Appl. No. 13/950,974, filed Nov. 19, 2010, from Haile, Awet A., dated Dec. 2, 2012.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/669,357, filed Nov. 5, 2012, dated Jan. 30, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Office Action Dated Jun. 10, 2015, U.S. Appl. No. 13/890,150, filed May 8, 2013.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.

(56) References Cited

OTHER PUBLICATIONS

Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated 27 Feb. 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.

* cited by examiner

DISTRIBUTED CONFIGURATION MANAGEMENT FOR VIRTUAL CLUSTER SWITCHING

RELATED APPLICATIONS

This application claims the benefit of U.S. Provisional Application No. 61/349,603, entitled "Distributed Configuration Management For Virtual Cluster Switching," by inventors Suresh Vobbilisetty, Shiv Haris, Phanidhar Koganti, and Vidyasagara R. Guntaka, filed 28 May 2010, and U.S. Provisional Application No. 61/380,818, entitled "Distributed Configuration Management For Virtual Cluster Switching," by inventors Suresh Vobbilisetty, Shiv Haris, Phanidhar Koganti, and Vidyasagara R. Guntaka, filed 8 Sep. 2010, the disclosure of which is incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010; and U.S. patent application Ser. No. 13/087,239, entitled "VIRTUAL CLUSTER SWITCHING," by inventors Suresh Vobbilisetty and Dilip Chatwani, filed 14 Apr. 2011;

the disclosures of which are incorporated by reference herein.

BACKGROUND

Field

The present disclosure relates to network design. More specifically, the present disclosure relates to a method for a constructing a scalable switching system that facilitates automatic configuration.

Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

SUMMARY

One embodiment of the present invention provides a switch. The switch includes a port to couple to a second switch. The switch also includes a control mechanism configured to maintain a set of configuration information for a virtual cluster switch which includes a number of member switches. The set of configuration information includes global configuration information for the virtual cluster switch and switch-specific configuration information for one or more member switches. In addition, the set of configuration information is replicated and stored at each member switch.

In a variation on this embodiment, the member switches in the virtual cluster switch are allowed to be coupled in an arbitrary topology, and the virtual cluster switch appears to be one single switch.

In a variation on this embodiment, the global configuration information includes one or more of: an identifier for the virtual cluster switch, an identifier of virtual local-area network (VLAN) supported by the virtual cluster switch, a switch domain identifier corresponding to a member switch, and a switch domain identifier corresponding to a principal switch.

In a further variation, the switch-specific configuration information includes one or more of: an indication of where a member switch is part of the virtual cluster switch, an indication of whether a member switch is a principal switch in the virtual cluster switch, a switch domain identifier for a member switch, an unique and persistent mapped identifier for a member switch, and an IP address assigned to the member switch.

In a variation on this embodiment, the switch is assigned an IP address based on a switch domain identifier assigned to the switch.

In a variation on this embodiment, a port of the switch is assigned a MAC address based on an organizationally unique identifier of the port and a switch domain identifier assigned to the switch.

On embodiment of the present invention provide a switch which maintains a set of configuration information for a virtual cluster switch. The virtual cluster switch includes a number of member switches. During operation, the switch receives an update to the set of configuration information, and confirms with another switch that the update is valid with respect to the set of configuration information maintained at the other switch. Based on the confirmation, the switch propagates the update to the member switches, thereby allowing the member switches to update their respective set of configuration information.

One embodiment of the present invention provides a virtual cluster switch. The virtual cluster switch includes a plurality of switches which are allowed to be coupled in an arbitrary topology. The virtual cluster switch also includes a control mechanism residing on a respective switch and configured to maintain a copy of the configuration information of the virtual cluster switch. In addition, the virtual cluster switch appears externally as a single switch

DETAILED DESCRIPTION

Figure 1A:
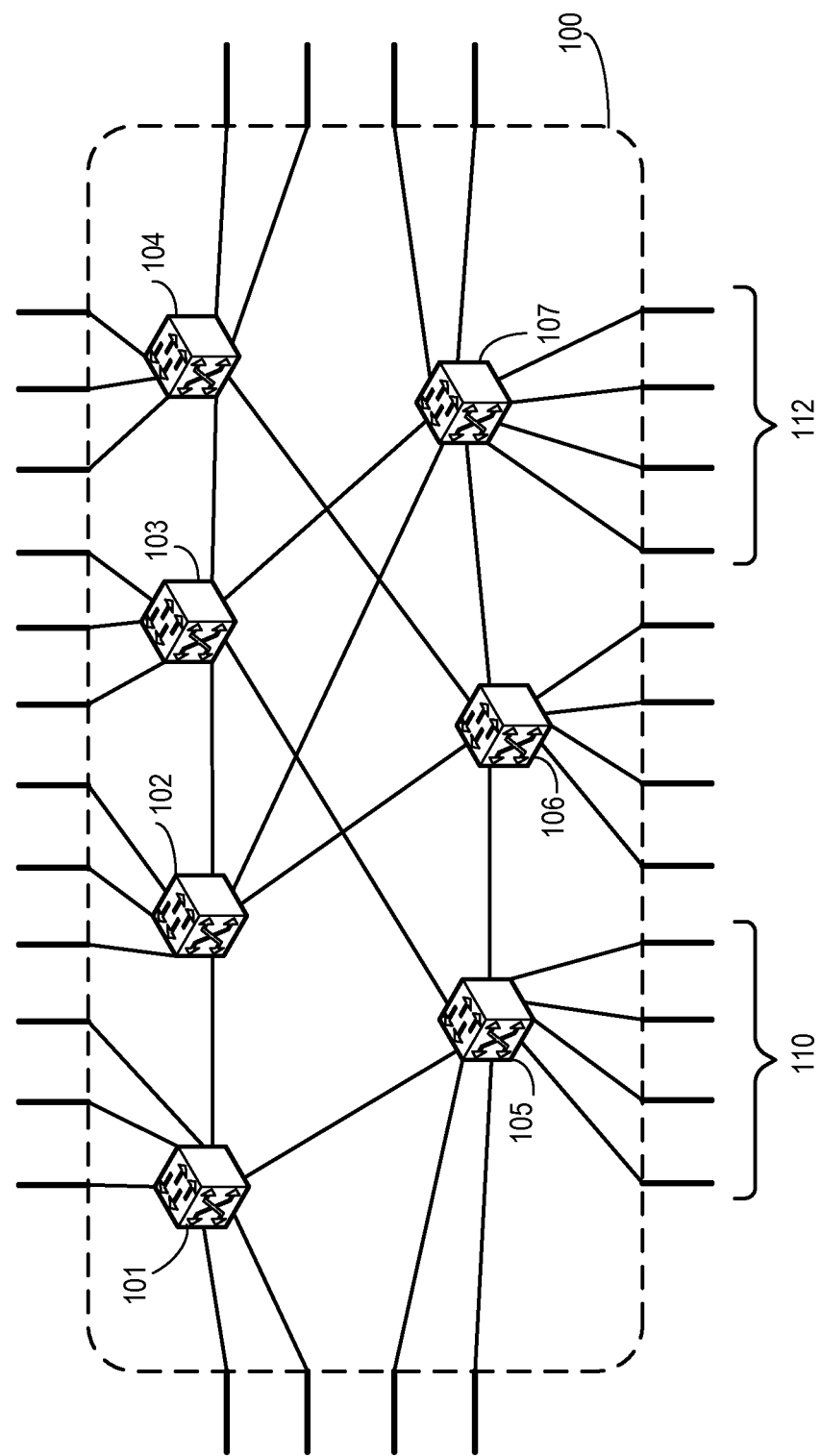
FIG. 1A illustrates an exemplary virtual cluster switch (VCS) system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of building a versatile, cost-effective, and scalable switching system is solved by running a control plane with automatic configuration capabilities (such as the Fibre Channel control plane) over a conventional transport protocol, thereby allowing a number of switches to form a switch cluster that can be represented as a single, scalable logical switch without requiring burdensome manual configuration. As a result, one can form a large-scale logical switch (referred to as a "virtual cluster switch" or VCS herein) using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large cluster switch, which can be viewed as a single logical switch externally.

It should be noted that a virtual cluster switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a VCS can include an arbitrary number of centralized or distributed switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the VCS, an individual physical switch can dynamically join or leave the VCS without disrupting services to the rest of the network.

One unique feature of the VCS is its distributed management of switch configurations. It allows an administrator to manage and configure any switch in the VCS from any and every member switch, similar to how a conventional physical switch can be configured—one can configure and manage the physical switch by accessing its control plane via any of its ports. Furthermore, the automatic and dynamic configurability of VCS allows a network operator to build its switching system in a distributed and "pay-as-you-grow" fashion without sacrificing scalability. The VCS's ability to respond to changing network conditions makes it an ideal solution in a virtual computing environment, where network loads often change with time.

Although this disclosure is presented using examples based on the Transparent Interconnection of Lots of Links (TRILL) as the transport protocol and the Fibre Channel (FC) fabric protocol as the control-plane protocol, embodiments of the present invention are not limited to TRILL networks, or networks defined in a particular Open System Interconnection Reference Model (OSI reference model) layer. For example, a VCS can also be implemented with switches running multi-protocol label switching (MPLS) protocols for the transport. In addition, the terms "RBridge" and "switch" are used interchangeably in this disclosure. The use of the term "RBridge" does not limit embodiments of the present invention to TRILL networks only. The TRILL protocol is described in Internet Engineering Task Force (IETF) Request for Comments (RFC) 6325, titled "RBridges: Base Protocol Specification," which is incorporated by reference herein.

The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required.

The term "RBridge" refers to routing bridges, which are bridges implementing the TRILL protocol as described in IETF draft "RBridges: Base Protocol Specification." Embodiments of the present invention are not limited to the application among RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

VCS Architecture

FIG. 1A illustrates an exemplary virtual cluster switch system, in accordance with an embodiment of the present invention. In this example, a VCS 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane runs an FC switch fabric protocol stack. The TRILL protocol facilitates transport of Ethernet frames within and across VCS 100 in a routed fashion (since TRILL provides routing functions to Ethernet frames). The FC switch fabric protocol stack facilitates the automatic configuration of individual physical switches, in a way similar to how a conventional FC switch fabric is formed and automatically configured. In one embodiment, VCS 100 can appear externally as an ultra-high-capacity Ethernet switch. More details on FC network architecture, protocols, naming/address conventions, and various standards are available in the documentation available from the NCITS/ANSI T11 committee and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the VCS) and other ports for inter-switch connection. Viewed externally, VCS 100 appears to be one switch to a device from the outside, and any port from any of the physical switches is considered one port on the VCS. For example, port groups 110 and 112 are both VCS external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. VCS 100 is based on a mesh topology. In further embodiments, a VCS can be based on a ring, fat tree, or other types of topologies.

In one embodiment, the protocol architecture of a VCS is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the VCS.

Figure 1B:
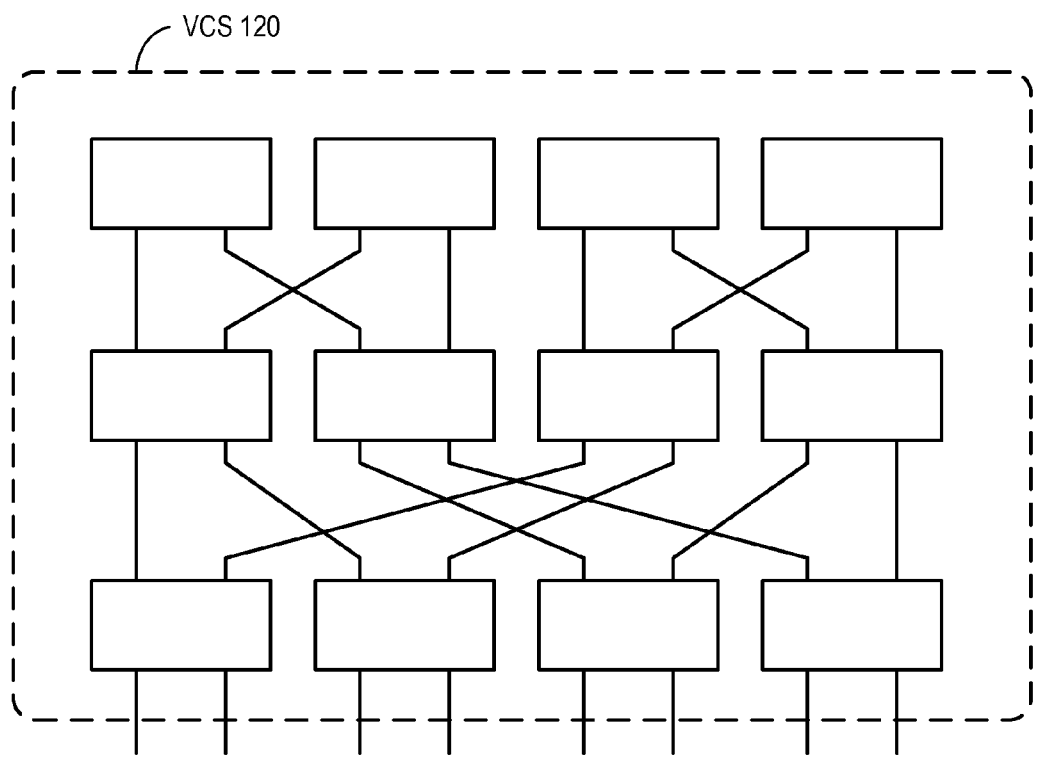
FIG. 1B illustrates an exemplary VCS system where the member switches are configured in a CLOS network, in accordance with an embodiment of the present invention.

Because of its automatic configuration capability, a VCS can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated switch complexity. FIG. 1B presents an exemplary VCS with its member switches connected in a CLOS network, in accordance with one embodiment of the present invention. In this example, a VCS 120 forms a fully non-blocking 8×8 switch, using eight 4×4 switches and four 2×2 switches connected in a three-stage CLOS network. A large-scale switch with a higher port count can be built in a similar way.

Figure 2:
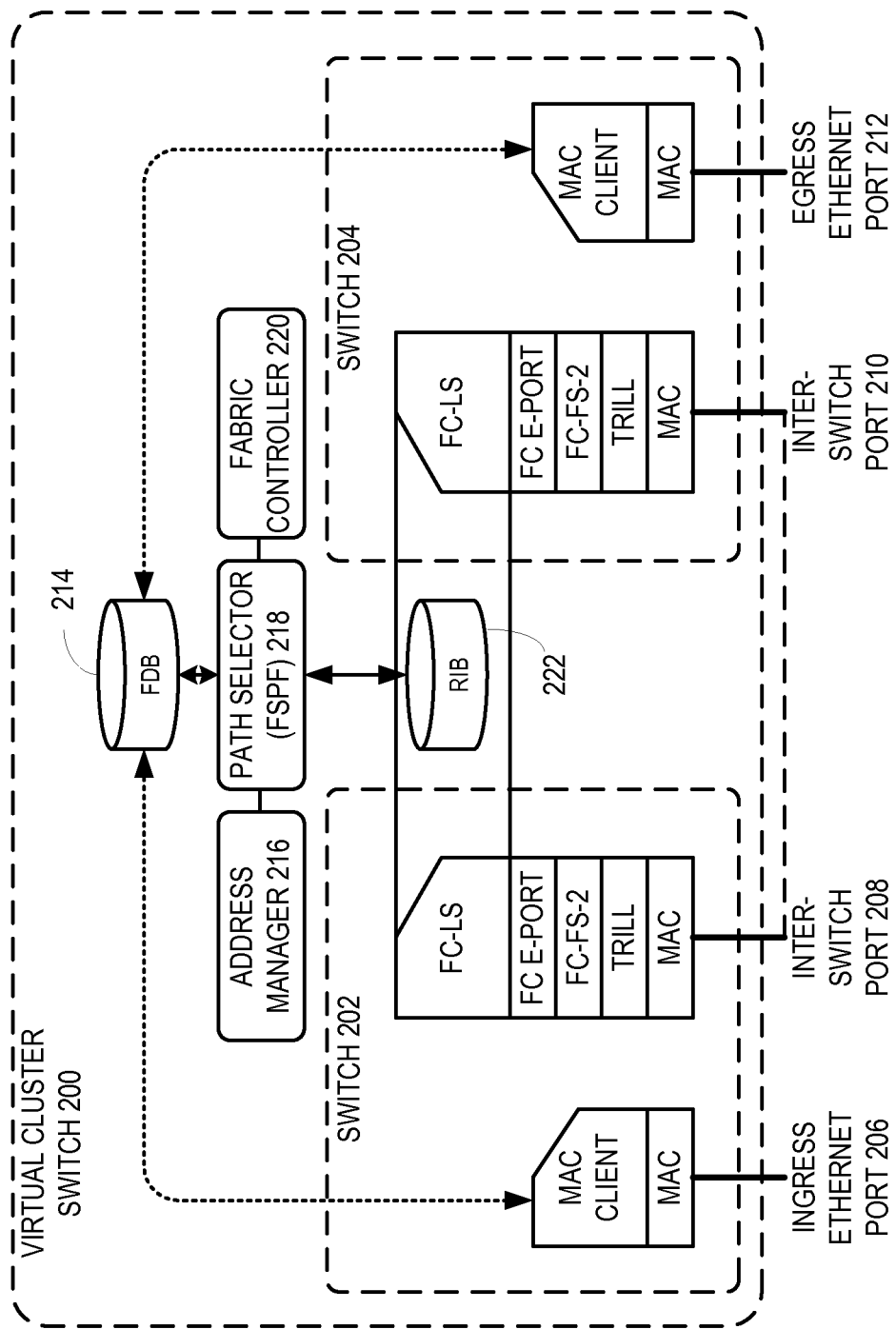
FIG. 2 illustrates the protocol stack within a virtual cluster switch, in accordance with an embodiment of the present invention.

FIG. 2 illustrates the protocol stack within a virtual cluster switch, in accordance with an embodiment of the present invention. In this example, two physical switches 202 and 204 are illustrated within a VCS 200. Switch 202 includes an ingress Ethernet port 206 and an inter-switch port 208. Switch 204 includes an egress Ethernet port 212 and an inter-switch port 210. Ingress Ethernet port 206 receives Ethernet frames from an external device. The Ethernet header is processed by a medium access control (MAC) layer protocol. On top of the MAC layer is a MAC client layer, which hands off the information extracted from the frame's Ethernet header to a forwarding database (FDB) 214. Typically, in a conventional IEEE 802.1Q Ethernet switch, FDB 214 is maintained locally in a switch, which would perform a lookup based on the destination MAC address and the VLAN indicated in the Ethernet frame. The lookup result would provide the corresponding output port. However, since VCS 200 is not one single physical switch, FDB 214 would return the egress switch's identifier (i.e., switch 204's identifier). In one embodiment, FDB 214 is a data structure replicated and distributed among all the physical switches. That is, every physical switch maintains its own copy of FDB 214. When a given physical switch learns the source MAC address and VLAN of an Ethernet frame (similar to what a conventional IEEE 802.1Q Ethernet switch does) as being reachable via the ingress port, the learned MAC and VLAN information, together with the ingress Ethernet port and switch information, is propagated to all the physical switches so every physical switch's copy of FDB 214 can remain synchronized. This prevents forwarding based on stale or incorrect information when there are changes to the connectivity of end stations or edge networks to the VCS.

The forwarding of the Ethernet frame between ingress switch 202 and egress switch 204 is performed via inter-switch ports 208 and 210. The frame transported between the two inter-switch ports is encapsulated in an outer MAC header and a TRILL header, in accordance with the TRILL standard. The protocol stack associated with a given inter-switch port includes the following (from bottom up): MAC layer, TRILL layer, FC-FS-2 layer, FC E-Port layer, and FC link services (FC-LS) layer. The FC-LS layer is responsible for maintaining the connectivity information of a physical switch's neighbor, and populating an FC routing information base (RIB) 222. This operation is similar to what is done in an FC switch fabric. The FC-LS protocol is also responsible for handling joining and departure of a physical switch in VCS 200. The operation of the FC-LS layer is specified in the FC-LS standard, the disclosure of which is incorporated herein in its entirety.

During operation, when FDB 214 returns the egress switch 204 corresponding to the destination MAC address of the ingress Ethernet frame, the destination egress switch's identifier is passed to a path selector 218. Path selector 218 performs a fabric shortest-path first (FSPF)-based route lookup in conjunction with RIB 222, and identifies the next-hop switch within VCS 200. In other words, the routing is performed by the FC portion of the protocol stack, similar to what is done in an FC switch fabric.

Also included in each physical switch are an address manager 216 and a fabric controller 220. Address manager 216 is responsible for configuring the address of a physical switch when the switch first joins the VCS. For example, when switch 202 first joins VCS 200, address manager 216 can negotiate a new FC switch domain ID, which is subsequently used to identify the switch within VCS 200. Fabric controller 220 is responsible for managing and configuring the logical FC switch fabric formed on the control plane of VCS 200.

One way to understand the protocol architecture of VCS is to view the VCS as an FC switch fabric with an Ethernet/TRILL transport. Each physical switch, from an external point of view, appears to be a TRILL RBridge. However, the switch's control plane implements the FC switch fabric software. In other words, embodiments of the present invention facilitate the construction of an "Ethernet switch fabric" running on FC control software. This unique combination provides the VCS with automatic configuration capability and allows it to provide the ubiquitous Ethernet services in a very scalable fashion.

Figure 3:
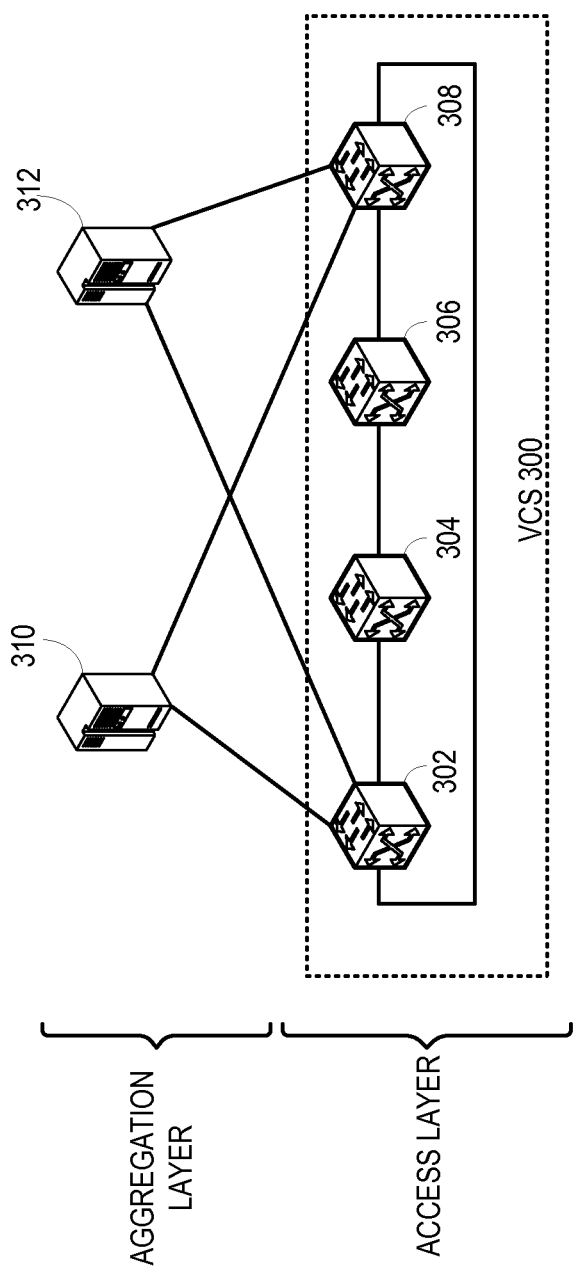
FIG. 3 illustrates an exemplary configuration of a virtual cluster switch, in accordance with an embodiment of the present invention.

FIG. 3 illustrates an exemplary configuration of a virtual cluster switch, in accordance with an embodiment of the present invention. In this example, a VCS 300 includes four physical switches 302, 304, 306, and 308. VCS 300 constitutes an access layer which is coupled to two aggregation switches 310 and 312. Note that the physical switches within VCS 300 are connected in a ring topology. Aggregation switch 310 or 312 can connect to any of the physical switches within VCS 300. For example, aggregation switch 310 is coupled to physical switches 302 and 308. These two links are viewed as a trunked link to VCS 300, since the corresponding ports on switches 302 and 308 are considered to be from the same logical switch, VCS 300. Note that, without VCS, such topology would not have been possible, because the FDB needs to remain synchronized, which is facilitated by the VCS.

Figure 4:
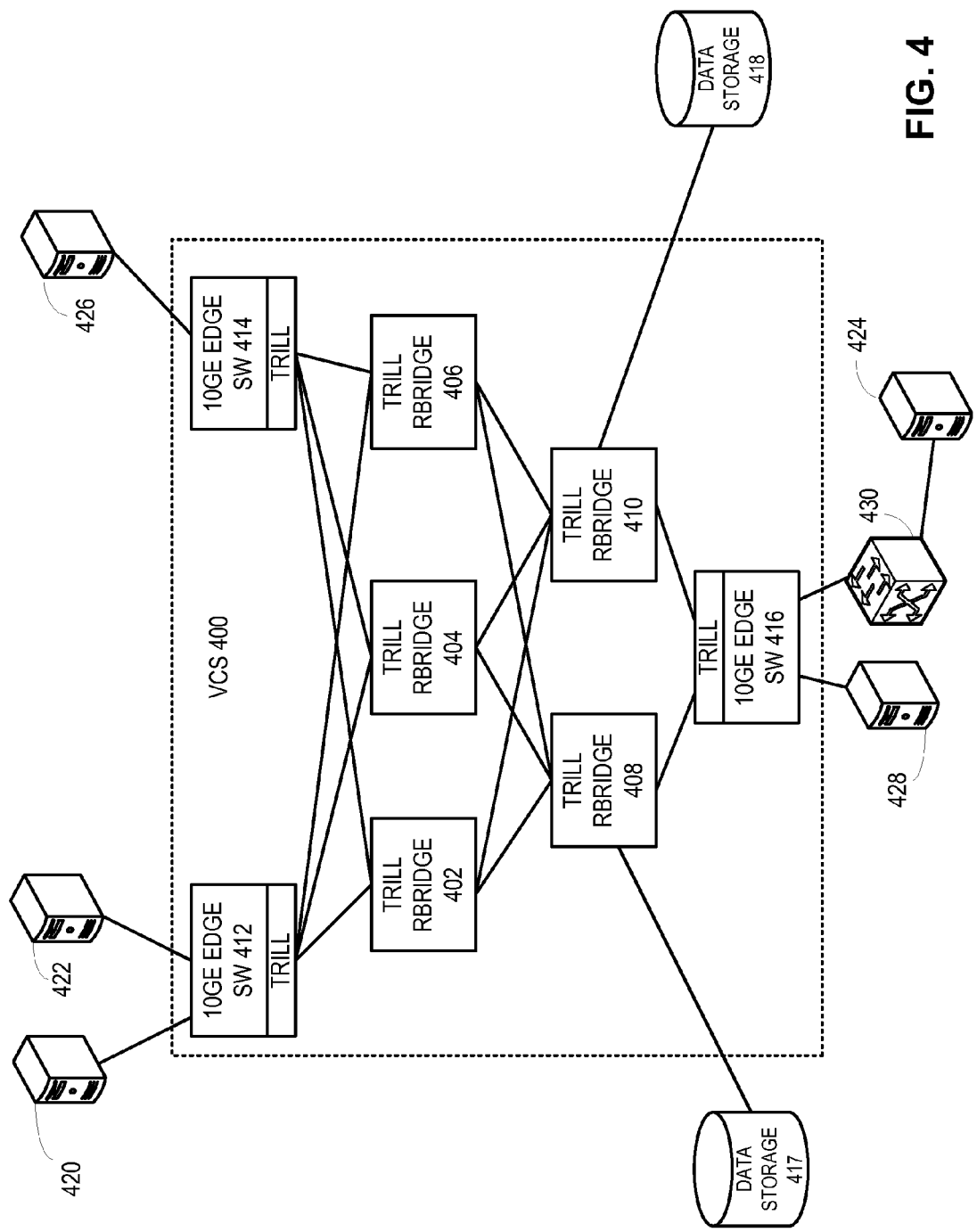
FIG. 4 illustrates an exemplary configuration of how a virtual cluster switch can be connected to different edge networks, in accordance with an embodiment of the present invention.

FIG. 4 illustrates an exemplary configuration of how a virtual cluster switch can be connected to different edge networks, in accordance with an embodiment of the present invention. In this example, a VCS 400 includes a number of TRILL RBridges 402, 404, 406, 408, and 410, which are controlled by the FC switch-fabric control plane. Also included in VCS 400 are RBridges 412, 414, and 416. Each RBridge has a number of edge ports which can be connected to external edge networks.

For example, RBridge 412 is coupled with hosts 420 and 422 via 10GE ports. RBridge 414 is coupled to a host 426 via a 10GE port. These RBridges have TRILL-based inter-switch ports for connection with other TRILL RBridges in VCS 400. Similarly, RBridge 416 is coupled to host 428 and an external Ethernet switch 430, which is coupled to an external network that includes a host 424. In addition, network equipment can also be coupled directly to any of the physical switches in VCS 400. As illustrated here, TRILL RBridge 408 is coupled to a data storage 417, and TRILL RBridge 410 is coupled to a data storage 418.

Although the physical switches within VCS 400 are labeled as "TRILL RBridges," they are different from the conventional TRILL RBridge in the sense that they are controlled by the FC switch fabric control plane. In other words, the assignment of switch addresses, link discovery and maintenance, topology convergence, routing, and forwarding can be handled by the corresponding FC protocols. Particularly, each TRILL RBridge's switch ID or nickname is mapped from the corresponding FC switch domain ID, which can be automatically assigned when a switch joins VCS 400 (which is logically similar to an FC switch fabric).

Note that TRILL is only used as a transport between the switches within VCS 400. This is because TRILL can readily accommodate native Ethernet frames. Also, the TRILL standards provide a ready-to-use forwarding mechanism that can be used in any routed network with arbitrary topology (although the actual routing in VCS is done by the FC switch fabric protocols). Embodiments of the present invention should be not limited to using only TRILL as the transport. Other protocols (such as multi-protocol label switching (MPLS) or Internet Protocol (IP)), either public or proprietary, can also be used for the transport.

VCS Formation

In one embodiment, a VCS is created by instantiating a logical FC switch in the control plane of each switch. After the logical FC switch is created, a virtual generic port (denoted as G_Port) is created for each Ethernet port on the RBridge. A G_Port assumes the normal G_Port behavior from the FC switch perspective. However, in this case, since the physical links are based on Ethernet, the specific transition from a G_Port to either an FC F_Port or E_Port is determined by the underlying link and physical layer protocols. For example, if the physical Ethernet port is connected to an external device which lacks VCS capabilities, the corresponding G_Port will be turned into an F_Port. On the other hand, if the physical Ethernet port is connected to a switch with VCS capabilities and it is confirmed that the switch on the other side is part of a VCS, then the G_Port will be turned into an E_port.

Figure 5A:
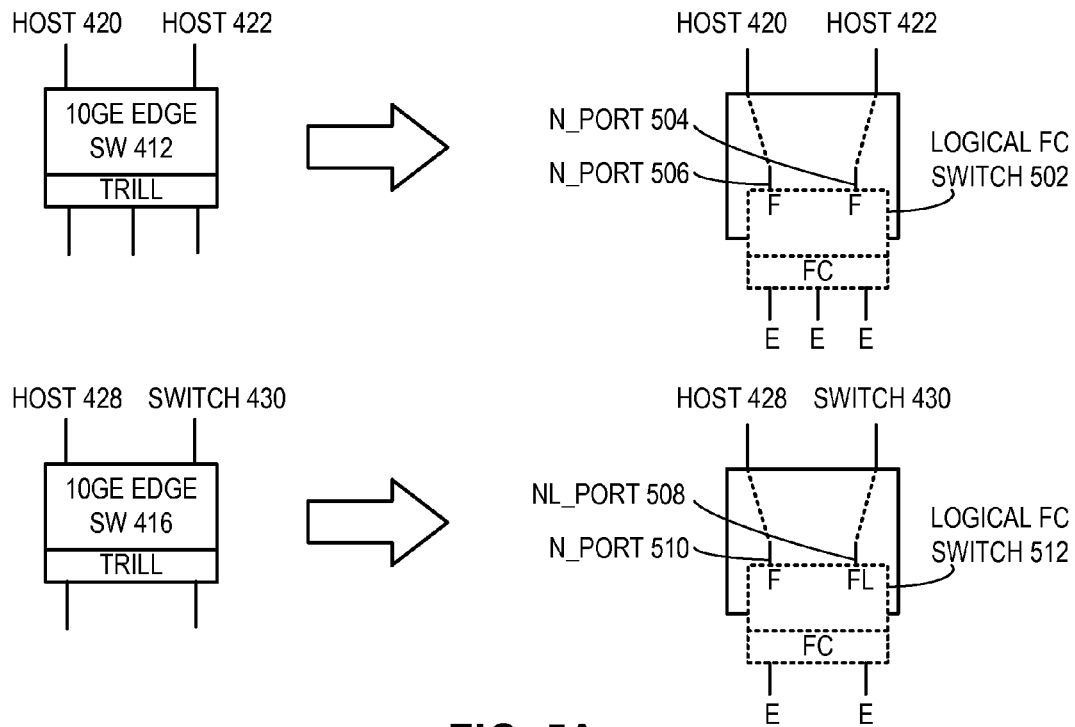
FIG. 5A illustrates how a logical Fibre Channel switch fabric is formed in a virtual cluster switch in conjunction with the example in FIG. 4, in accordance with an embodiment of the present invention.

FIG. 5A illustrates how a logical Fibre Channel switch fabric is formed in a virtual cluster switch in conjunction with the example in FIG. 4, in accordance with an embodiment of the present invention. RBridge 412 contains a virtual, logical FC switch 502. Corresponding to the physical Ethernet ports coupled to hosts 420 and 422, logical FC switch 502 has two logical F_Ports, which are logically coupled to hosts 420 and 422. In addition, two logical N_Ports, 506 and 504, are created for hosts 420 and 422, respectively. On the VCS side, logical FC switch 502 has three logical E_Ports, which are to be coupled with other logical FC switches in the logical FC switch fabric in the VCS.

Similarly, RBridge 416 contains a virtual, logical FC switch 512. Corresponding to the physical Ethernet ports coupled to host 428 and external switch 430, logical FC switch 512 has a logical F_Port coupled to host 428, and a logical FL_Port coupled to switch 430. In addition, a logical N_Port 510 is created for host 428, and a logical NL_Port 508 is created for switch 430. Note that the logical FL_Port is created because that port is coupled to a switch (switch 430), instead of a regular host, and therefore logical FC switch 512 assumes an arbitrated loop topology leading to switch 430. Logical NL_Port 508 is created based on the same reasoning to represent a corresponding NL_Port on switch 430. On the VCS side, logical FC switch 512 has two logical E_Ports, which to be coupled with other logical FC switches in the logical FC switch fabric in the VCS.

Figure 5B:
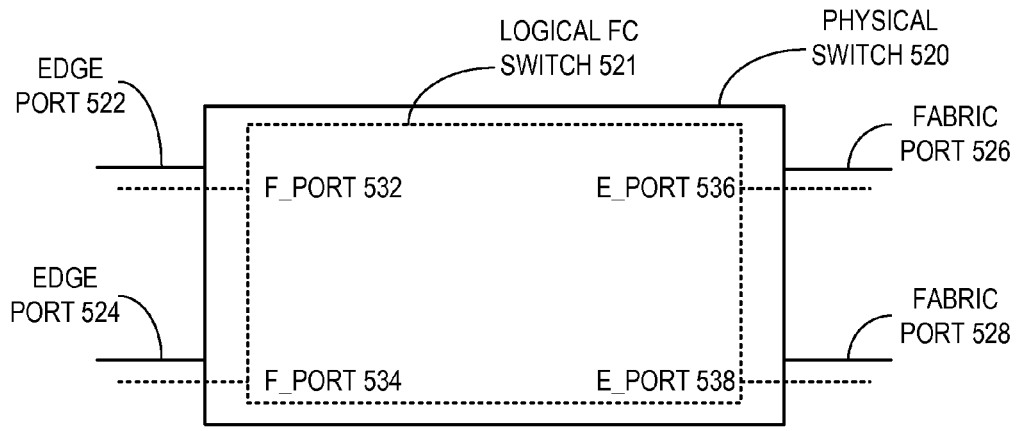
FIG. 5B illustrates an example of how a logical FC switch can be created within a physical Ethernet switch, in accordance with one embodiment of the present invention.

FIG. 5B illustrates an example of how a logical FC switch can be created within a physical Ethernet switch, in accordance with one embodiment of the present invention. The term "fabric port" refers to a port used to couple multiple switches in a VCS. The clustering protocols control the forwarding between fabric ports. The term "edge port" refers to a port that is not currently coupled to another switch unit in the VCS. Standard IEEE 802.1Q and layer-3 protocols control forwarding on edge ports.

In the example illustrated in FIG. 5B, a logical FC switch 521 is created within a physical switch (RBridge) 520. Logical FC switch 521 participates in the FC switch fabric protocol via logical inter-switch links (ISLs) to other switch units and has an FC switch domain ID assigned to it just as a physical FC switch does. In other words, the domain allocation, principal switch selection, and conflict resolution work just as they would on a physical FC ISL.

The physical edge ports 522 and 524 are mapped to logical F_Ports 532 and 534, respectively. In addition, physical fabric ports 526 and 528 are mapped to logical E_Ports 536 and 538, respectively. Initially, when logical FC switch 521 is created (for example, during the boot-up sequence), logical FC switch 521 only has four G_Ports which correspond to the four physical ports. These G_Ports are subsequently mapped to F_Ports or E_Ports, depending on the devices coupled to the physical ports.

Neighbor discovery is the first step in VCS formation between two VCS-capable switches. It is assumed that the verification of VCS capability can be carried out by a handshake process between two neighbor switches when the link is first brought up.

Distributed Configuration Management

In general, a VCS presents itself as one unified switch composed of multiple member switches. Hence, the creation and configuration of VCS is of critical importance. In one embodiment, the VCS configuration is based on a distributed database, which is replicated and distributed over all switches. In other words, each VCS member switch maintains a copy of the VCS configuration database, and any change to the database is propagated to all the member switches. As a result, a network administrator can configure any part of the VCS from anywhere by, for example, executing a command line interface (CLI) command from any member switch.

In one embodiment, a VCS configuration database includes a global configuration table (GT) of the VCS and a list of switch description tables (STs), each of which describes a VCS member switch. In its simplest form, a member switch can have a VCS configuration database that includes a global table and one switch description table, e.g., [<GT><ST>]. A VCS with multiple switches will have a configuration database that has a single global table and multiple switch description tables, e.g., [<GT><ST0><ST1> . . . <STn−1>]. The number n corresponds to the number of member switches in the VCS. In one embodiment, the GT can include at least the following information: the VCS ID, number of nodes in the VCS, a list of VLANs supported by the VCS, a list of all the switches (e.g., list of FC switch domain IDs for all active switches) in the VCS, and the FC switch domain ID of the principal switch (as in a logical FC switch fabric). A switch description table can include at least the following information: the IN_VCS flag, indication whether the switch is a principal switch in the logical FC switch fabric, the FC switch domain ID for the switch, the FC world-wide name (WWN) for the corresponding logical FC switch; the mapped ID of the switch, and optionally the IP address of the switch. Note that, as explained below, a switch can have an IP address dynamically assigned to it when it joins the VCS. The IP address can be derived from and have a one-to-one mapping to the FC switch domain ID assigned to the switch.

In addition, each switch's global configuration database is associated with a transaction ID. The transaction ID specifies the latest transaction (e.g., update or change) incurred to the global configuration database. The transaction IDs of the global configuration databases in two switches can be compared to determine which database has the most current information (i.e., the database with the more current transaction ID is more up-to-date). In one embodiment, the transaction ID is the switch's serial number plus a sequential transaction number. This configuration can unambiguously resolve which switch has the latest configuration.

Figure 6:
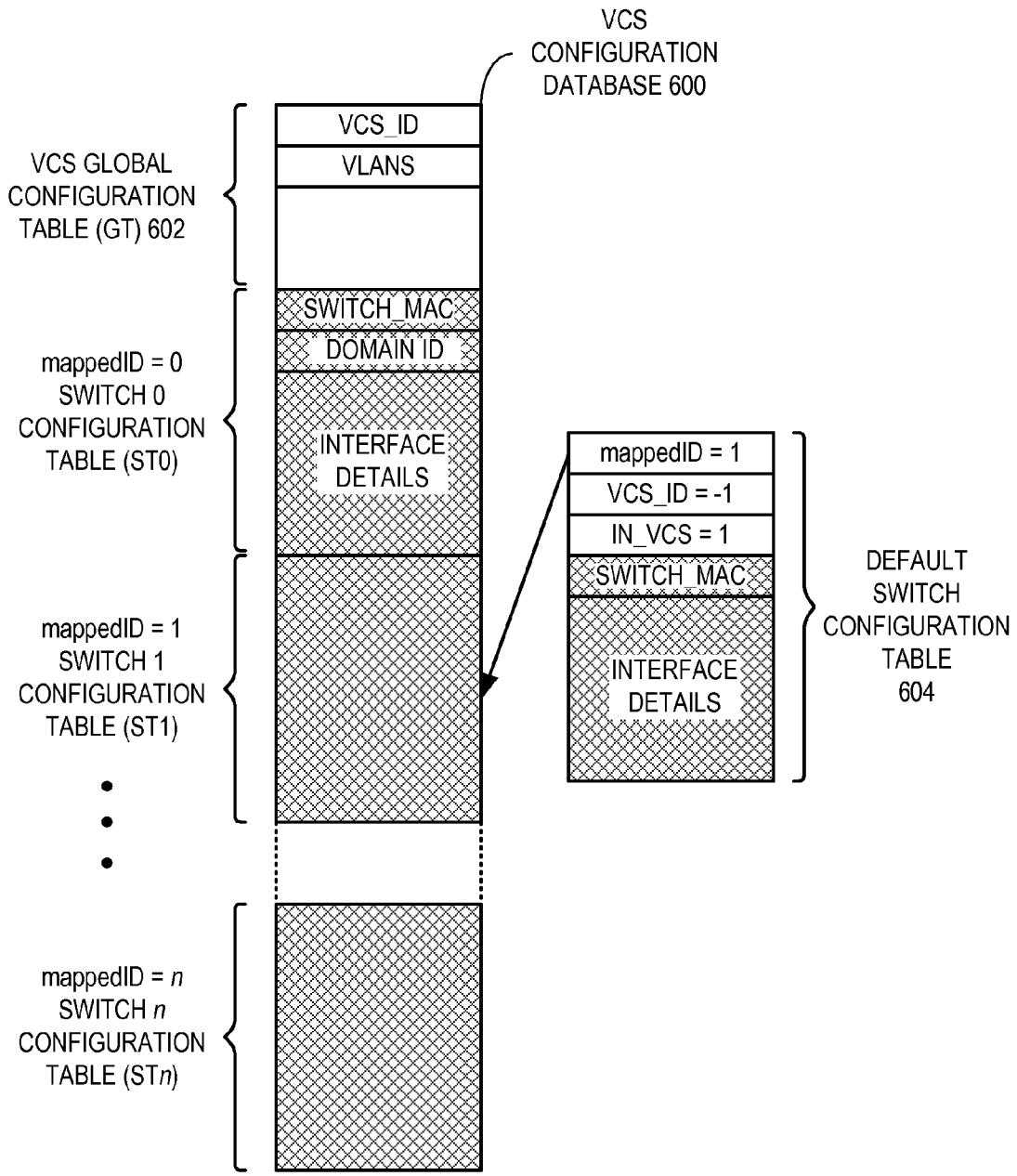
FIG. 6 illustrates an exemplary VCS configuration database, in accordance with an embodiment of the present invention.

As illustrated in FIG. 6, a VCS member switch typically maintains two configuration tables that describe its instance: a VCS configuration database 600, and a default switch configuration table 604. VCS configuration database 600 describes the VCS configuration when the switch is part of a VCS. Default switch configuration table 604 describes the switch's default configuration. VCS configuration database 600 includes a GT 602, which includes a VCS identifier (denoted as VCS_ID) and a VLAN list within the VCS. Also included in VCS configuration database 600 are a number of STs, such as ST0, ST1, and STn. Each ST includes the corresponding member switch's MAC address and FC switch domain ID, as well as the switch's interface details.

In one embodiment, each switch also has a VCS-mapped ID (denoted as "mappedID"), which is a switch index within the VCS. This mapped ID is unique and persistent within the VCS. That is, when a switch joins the VCS for the first time, the VCS assigns a mapped ID to the switch. This mapped ID persists with the switch, even if the switch leaves the VCS. When the switch joins the VCS again at a later time, the same mapped ID is used by the VCS to retrieve previous configuration information for the switch. This feature can reduce the amount of configuration overhead in VCS. Also, the persistent mapped ID allows the VCS to "recognize" a previously configured member switch when it re-joins the VCS, since a dynamically assigned FC fabric domain ID would change each time the member switch joins and is configured by the VCS.

In the example illustrated in FIG. 6, default switch configuration table 604 has an entry for the mapped ID that points to the corresponding ST in VCS configuration database 600. Note that only VCS configuration database 600 is replicated and distributed to all switches in the VCS. Default switch configuration table 604 is local to a particular member switch.

The "IN_VCS" value in default switch configuration table 604 indicates whether the member switch is part of a VCS. A switch is considered to be "in a VCS" when it is assigned one of the FC switch domains by the FC switch fabric with two or more switch domains. If a switch is part of an FC switch fabric that has only one switch domain, i.e., its own switch domain, then the switch is considered to be "not in a VCS."

When a switch is first connected to a VCS, the logical FC switch fabric formation process running on a neighboring switch which is part of the VCS allocates a new FC switch domain ID to the joining switch. In one embodiment, only the switches directly connected to the new switch participate in the VCS join operation.

Note that in the case where the global configuration database of a joining switch is current and in sync with the global configuration database of the VCS based on a comparison of the transaction IDs of the two databases (e.g., when a member switch is temporarily disconnected from the VCS and reconnected shortly afterward), a trivial merge is performed. That is, the joining switch can be connected to the VCS, and no change or update to the global VCS configuration database is required.

When a switch joins a VCS (see the description below), the VCS assigns an FC switch domain ID to the logical FC switch formed within the joining switch. The joining switch can be automatically assigned an IP address (which in one embodiment can be internal to the VCS) corresponding to the FC switch domain ID. For example, the joining switch's IP address can be 127.10.10.FC_domain_ID. In addition, each port on the joining switch can be automatically assigned a MAC address which is unique to that port, on that switch. For instance, a port on the joining switch can be assigned a MAC address of OUI:FC_domain_ID:0:0, where OUI is the Organizationally Unique Identifier for the port, and FC_domain_ID is the switch domain ID assigned to the logical FC switch. The IP and MAC address assignment process can be part of the software within the switch which controls the FC switch formation and the join/merge process.

The automatically assigned switch IP address and port MAC address for a given VCS member switch allow any port on the switch to be remotely configured from anywhere within the VCS. For example, a configuration command of a given member switch can be issued from a host connected to any member switch in the VCS and identifies the switch to be configured by its IP address and optionally one or more port MAC addresses. Such configuration command might include information on VLAN configuration, quality-of-service (QoS) configuration, and/or access-control configuration, each of which can be port-specific. In one embodiment, the change to a switch's configuration is tentatively transmitted to the switch. After the switch confirms and validates the change, a commit-change command is transmitted to all the member switches in the VCS, so the global configuration database can be updated throughout the VCS. In a further embodiment, the change is tentatively transmitted to all the member switches in the VCS, and the commit-change command is only sent out after all the switches confirm and validate the tentatively change.

VCS Join and Merge

Figure 7A:
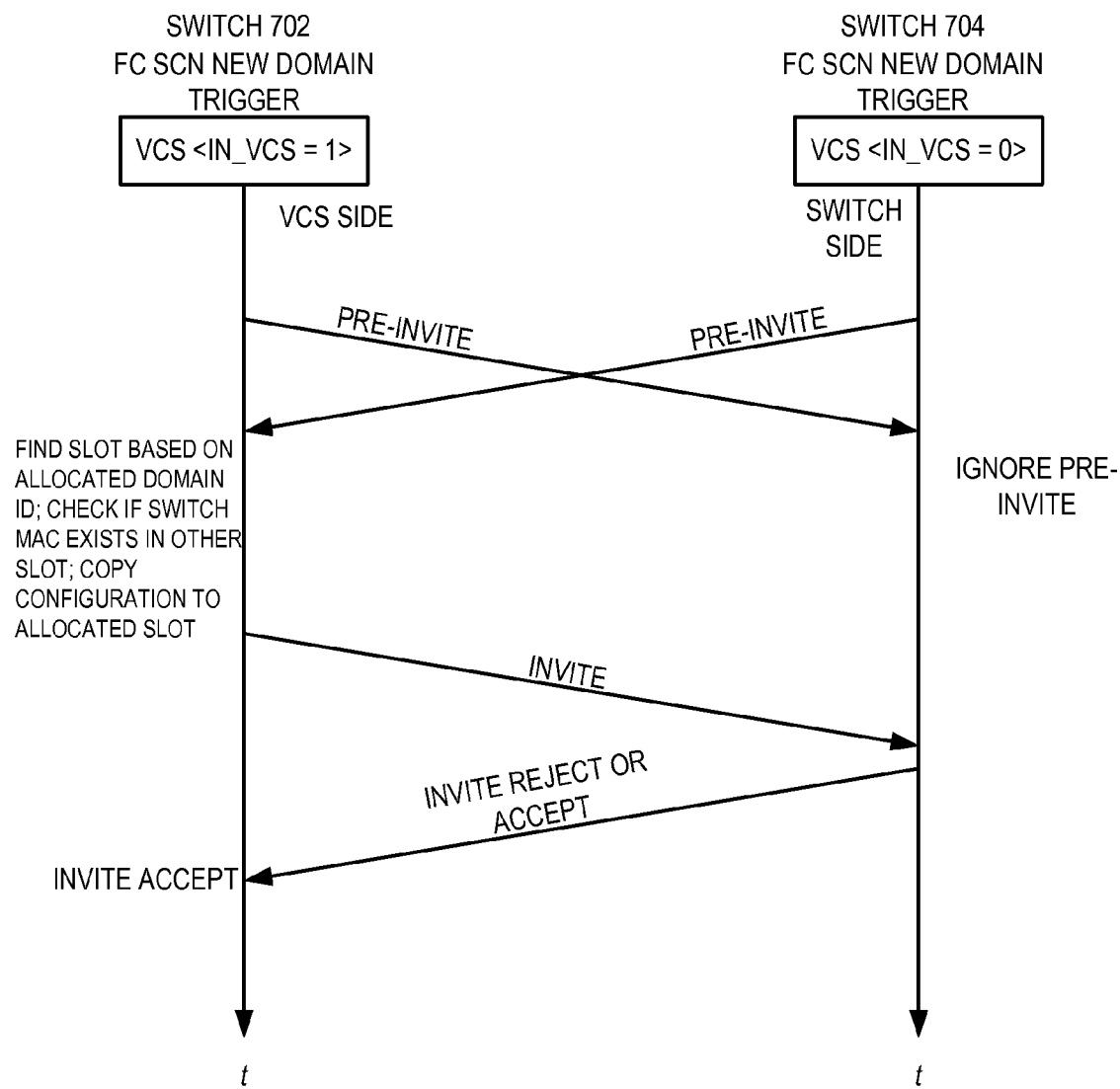
FIG. 7A illustrates an exemplary process of a switch joining a virtual cluster switch, in accordance with an embodiment of the present invention.

FIG. 7A illustrates an exemplary process of a switch joining a virtual cluster switch, in accordance with an embodiment of the present invention. In this example, it is assumed that a switch 702 is within an existing VCS, and a switch 704 is joining the VCS. During operation, both switches 702 and 704 trigger an FC State Change Notification (SCN) process. Subsequently, both switches 702 and 704 perform a PRE-INVITE operation. The PRE-INVITE operation involves the following process.

When a switch joins the VCS via a link, both neighbors on each end of the link present to the other switch a VCS four-tuple of <Prior VCS_ID, SWITCH_MAC, mappedID, IN_VCS> from a prior incarnation, if any. Otherwise, the switch presents to the counterpart a default tuple. If the VCS_ID value was not set from a prior join operation, a VCS_ID value of −1 is used. In addition, if a switch's IN_VCS flag is set to 0, it sends out its interface configuration to the neighboring switch. In the example in FIG. 7, both switches 702 and 704 send the above information to the other switch.

After the above PRE-INVITE operation, a driver switch for the join process is selected. By default, if a switch's IN_VCS value is 1 and the other switch's IN_VCS value is 0, the switch with IN_VCS=1 is selected as the driver switch. If both switches have their IN_VCS values as 1, then nothing happens, i.e., the PRE-INVITE operation would not lead to an INVITE operation. If both switches have their IN_VCS values as 0, then one of the switches is elected to be the driving switch (for example, the switch with a lower FC switch domain ID value). The driving switch's IN_VCS value is then set to 1 and drives the join process.

After switch 702 is selected as the driver switch, switch 702 then attempts to reserve a slot (i.e., a switch description table) in the VCS configuration database corresponding to the mappedID value in switch 704's PRE-INVITE information. Next, switch 702 searches the VCS configuration database for switch 704's MAC address in any mappedID slot. If such a slot is found, switch 702 copies all information from the identified slot into the reserved slot. Otherwise, switch 702 copies the information received during the PRE-INVITE from switch 704 into the VCS configuration database. The updated VCS configuration database is then propagated to all the switches in the VCS as a prepare operation in the database (note that the update is not committed to the database yet).

Subsequently, the prepare operation may or may not result in configuration conflicts, which may be flagged as warnings or fatal errors. Such conflicts can include inconsistencies between the joining switch's local configuration or policy setting and the VCS configuration. For example, a conflict arises when the joining switch is manually configured to allow packets with a particular VLAN value to pass through, whereas the VCS does not allow this VLAN value to enter the switch fabric from this particular RBridge (for instance, when this VLAN value is reserved for other purposes). A conflict can also arise when the joining switch's access-control policy is inconsistent with the VCS's access-control policy. In one embodiment, the prepare operation is handled locally and/or remotely in concert with other VCS member switches. If there is an un-resolvable conflict, switch 702 sends out a PRE-INVITE-FAILED message to switch 704. Otherwise, switch 702 generates an INVITE message with the VCS's merged view of the switch (i.e., the updated VCS configuration database).

Upon receiving the INVITE message, switch 704 either accepts or rejects the INVITE. The INVITE can be rejected if the configuration in the INVITE is in conflict with what switch 704 can accept. If the INVITE is acceptable, switch 704 sends back an INVITE-ACCEPT message in response. The INVITE-ACCEPT message then triggers a final database commit throughout all member switches in the VCS. In other words, the updated VCS configuration database is updated, replicated, and distributed to all the switches in the VCS.

If more than one switch in a VCS has connectivity to the new joining switch, all these neighboring member switches may send PRE-INVITE to the new joining switch. The joining switch can send out only one PRE-INVITE to a randomly selected neighboring member switch to complete the join process. Various use cases of the join process are described below. In the following description, a "joining switch" refers to a switch attempting to join a VCS. A "neighboring VCS member switch" or "neighboring member switch" refers to a VCS member switch to which the joining switch is connected.

VCS Pre-Provisioned to Accept a Switch.

A VCS is pre-configured (e.g., the global configuration database) with the MAC address of a joining switch with an optionally pre-allocated mapped ID for the joining switch. The joining switch may be allowed to carry any value in the VCS_ID field of its existing configuration. The neighboring VCS member switch can assign an FC switch domain ID and the proper VCS_ID to the joining switch in the INVITE message. In one embodiment, the joining switch may be pre-provisioned to join an existing VCS (e.g., with the parameters in the default switch configuration table, such as mappedID, VCS_ID, and IN_VCS, populated with values corresponding to the VCS). If the pre-provisioned parameters do not guarantee a slot with the same mappedID in the global configuration database when the switch joins the VCS, the switch can revert to the default joining procedure described below.

Default Switch Joins a VCS.

A default switch is one that has no records of any previous joining with a VCS. A switch can become a default switch if it is forced into a factory default state. A joining default switch can present its initial configuration information (for example, its interface configuration details) to a neighboring VCS member switch. In one embodiment, a slot in the VCS configuration database is selected based on a monotonically incrementing number, which is used as the mapped ID for the joining switch. The corresponding FC switch domain ID which is allocated to the joining switch and the joining switch's MAC is updated accordingly in this slot. The neighboring VCS member switch then initiates a prepare transaction, which propagates to all VCS member switches and requires an explicit validation of the joining switch's configuration information from each VCS member switch. If the prepare transaction fails, a PRE-INVITE-FAILED message is sent to the joining switch and the joining process is aborted.

Figure 7B:
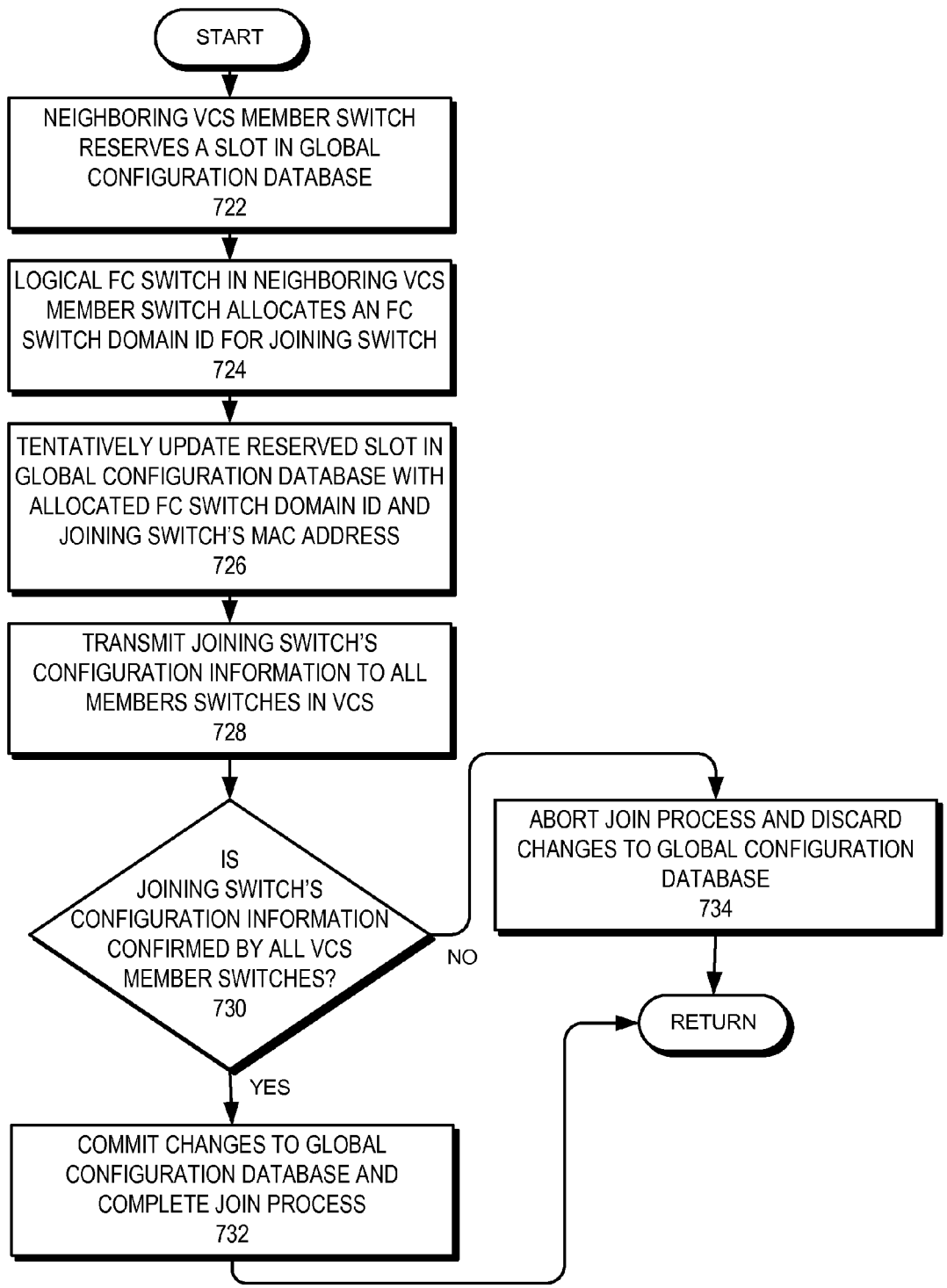
FIG. 7B presents a flowchart illustrating the process of a default switch joining a VCS, in accordance with one embodiment of the present invention.

FIG. 7B presents a flowchart illustrating the process of a default switch joining a VCS, in accordance with one embodiment of the present invention. During operation, after a joining switch with default configuration is connected to a neighboring VCS member switch, the VCS member switch reserves a slot in the global configuration database (operation 722). The reserved slot corresponds to a mappedID value which is also assigned to the joining switch. Subsequently, the logical FC switch within the neighboring VCS member switch allocates an FC switch domain ID for the joining switch (operation 724). This operation resembles a similar fabric login operation in the FC switch fabric join process.

The neighboring VCS member switch then tentatively updates the reserved slot in the global configuration database with the allocated FC switch domain ID and the joining switch's MAC address (operation 726). Next, the neighboring VCS member switch transmits the joining switch's tentative configuration to all member switches in the VCS (operation 728), and determines whether the joining switch's configuration information is confirmed and validated by all VCS member switches (operation 730). If the joining switch's configuration is confirmed, the neighboring member switch then commits the changes to the global configuration database and completes the join process (operation 732). Otherwise, the join process is aborted and the tentative changes to the global configuration database are discarded (operation 734).

Switch Re-Joins a Previously Joined VCS.

If for some reason a switch is joining a VCS to which the switch previously belongs (for example, due to a link failure), the FC switch domain ID that is re-allocated to the joining switch will most likely be the same. When such a switch joins the VCS, the neighboring VCS member switch first checks whether the joining switch's VCS_ID is the same as the existing VCS_ID on the member switch. If the two VCS_ID values are the same, the neighboring member switch attempts to find a slot in the global configuration database with the same mappedID value which was received from the joining switching during the tuple-exchange process. If such a slot in the global database is available, the slot is reserved for the joining switch. In addition, the global configuration database is searched for a match to the joining switch's MAC address. If a match is found in another slot, the configuration information from that slot is copied to the reserved slot. Subsequently, the join process continues as described in FIG. 7A. If the two VCS_ID values are different, the system performs a join process as described blow for the use case "switch joins another VCS."

Figure 7C:
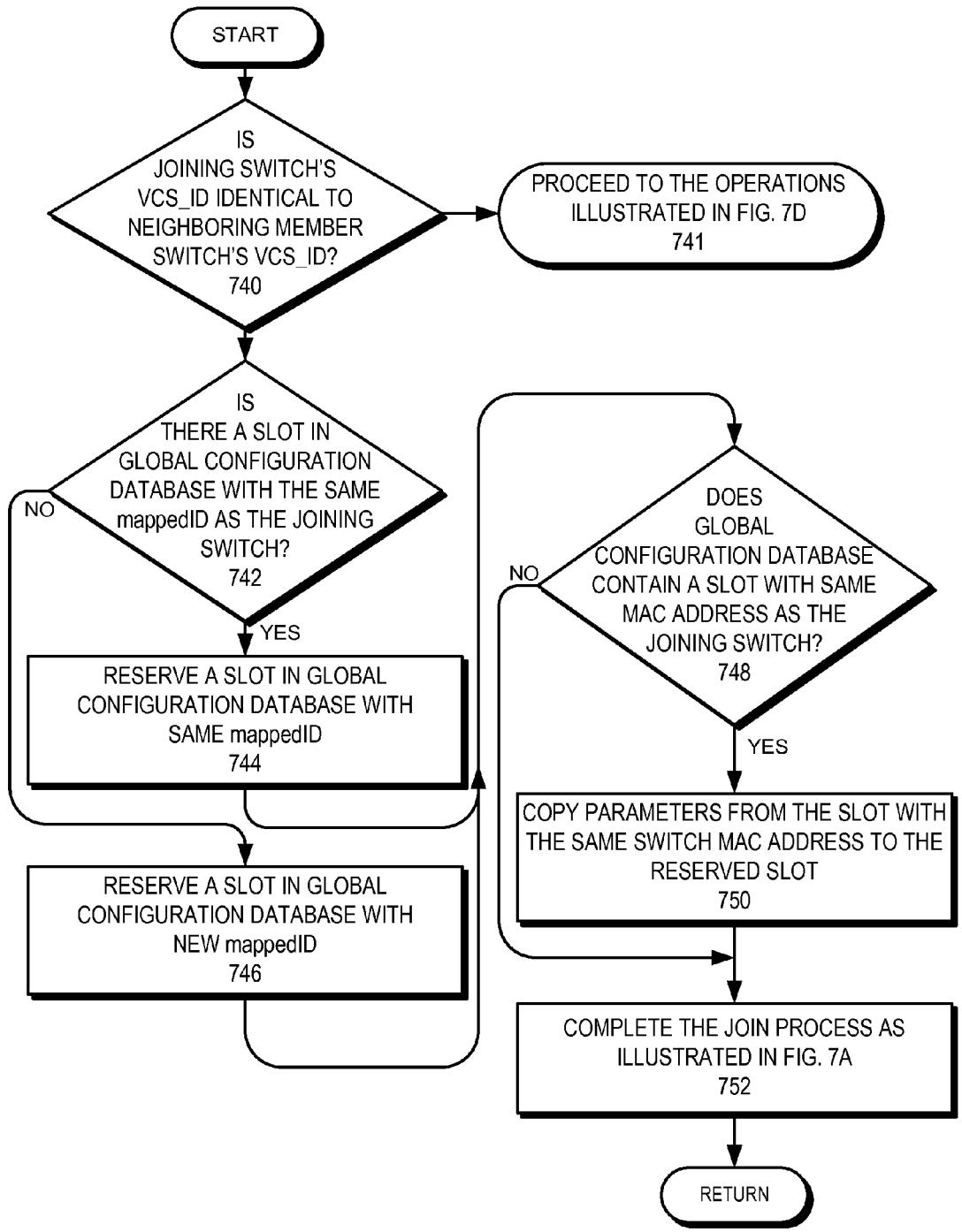
FIG. 7C presents a flowchart illustrating the process of a switch re-joining a previously joined VCS, in accordance with one embodiment of the present invention.

FIG. 7C presents a flowchart illustrating the process of a switch re-joining a previously joined VCS, in accordance with one embodiment of the present invention. During operation, a neighboring member switch first determines whether the joining switch's existing VCS_ID is the same as the neighboring member switch's VCS_ID (operation 740). If the two VCS_IDs are different, the joining process proceeds to the operations illustrated in FIG. 7D (operation 741). If the two VCS_IDs are the same, which means that the joining switch has previously been part of the same VCS, the neighboring member switch further determines whether there is a slot in the global configuration database with the same mappedID as the joining switch (operation 742). If so, the neighboring member switch reserves a slot in the global configuration database with the same mappedID (operation 744). Otherwise, the neighboring member switch reserves a slot in the global configuration database with a new mappedID, which is also communicated to the joining switch (operation 746).

Subsequently, the neighboring member switch determines whether the global configuration database contains a slot with the same MAC address as the joining switch (operation 748). If there is such a slot, which means that the global configuration database contains a slot which has been used previously for the same joining switch's configuration information, such information is copied from the identified slot to the reserved slot (operation 750). Otherwise, the neighboring member switch proceeds to complete the join process as illustrated in FIG. 7A.

Switch Joins Another VCS.

This use case occurs when a switch is disconnected from one VCS and then connected to a different VCS without being reset to the default state. This scenario can also occur when a switch is connected to a VCS while it is participating in another VCS. In such cases, there will be a VCS_ID mismatch in the join process. In addition, the IN_VCS field in the joining switch's configuration table might or might not be set. If the IN_VCS field is not set, which means that the joining switch is not currently participating in a VCS, the join process can assign the switch a new VCS_ID corresponding to the VCS the switch is joining. In one embodiment, if the IN_VCS filed is set in the joining switch's configuration, which means that the joining switch is currently participating in a different VCS, the join process is disallowed. Optionally, the joining switch can complete the joining process after being set to the default state.

Initial Joining of Two Switches which are Both not in a VCS.

When two switches are connected together and both of them are not in a VCS, an election process can be used to let one of them be the driving switch in the VCS formation process. In one embodiment, the switch with a lower FC switch domain ID would have its IN_VCS field set to "1" and drives the join process.

Joining of Two VCSs.

In one embodiment, two VCSs are allowed to merge together. Similar to the FC switch fabric formation process, the logical FC switches in both VCSs would select a new principal FC switch. This newly selected principal FC switch then re-assigns FC switch domain IDs to all the member switches. After the FC switch domain IDs are assigned, a "fabric up" message which is broadcast to all the member switches starts the VCS join process.

During the join process, the principal FC switch's IN_VCS field is set to "1," whereas all other member switches' IN_VCS fields are set to "0." Subsequently, each member switch can join the VCS (which initially only contains the switch with the principal FC switch) using the "switch joins another VCS" procedure described above.

Removal of a Switch from VCS.

When a switch is removed from a VCS, its neighboring member switch typically receives a "domain-unreachable" notification at its logical FC switch. Upon receiving this notification, the neighboring member switch disables this switch from the global VCS configuration database and propagates this change to all other member switches. Optionally, the neighboring member switch does not clear the slot previously used by the removed switch in the global configuration database. This way, if the departure of the switch is only temporary, the same slot in the configuration database can still be used when the switch re-joins the VCS.

If the VCS is temporarily disjoint due to a link failure, the logical FC infrastructure in the member switches can detect the disconnection of the switch(es) and issues a number of "domain-unreachable" notifications. When the disjoint switch is reconnected to the VCS, a comparison between the switch's configuration information and the corresponding slot information in the global VCS configuration database allows the switch to be added to the VCS using the same slot (i.e., the slot with the same mappedID) in the global configuration database.

General Operation.

Figure 7D:
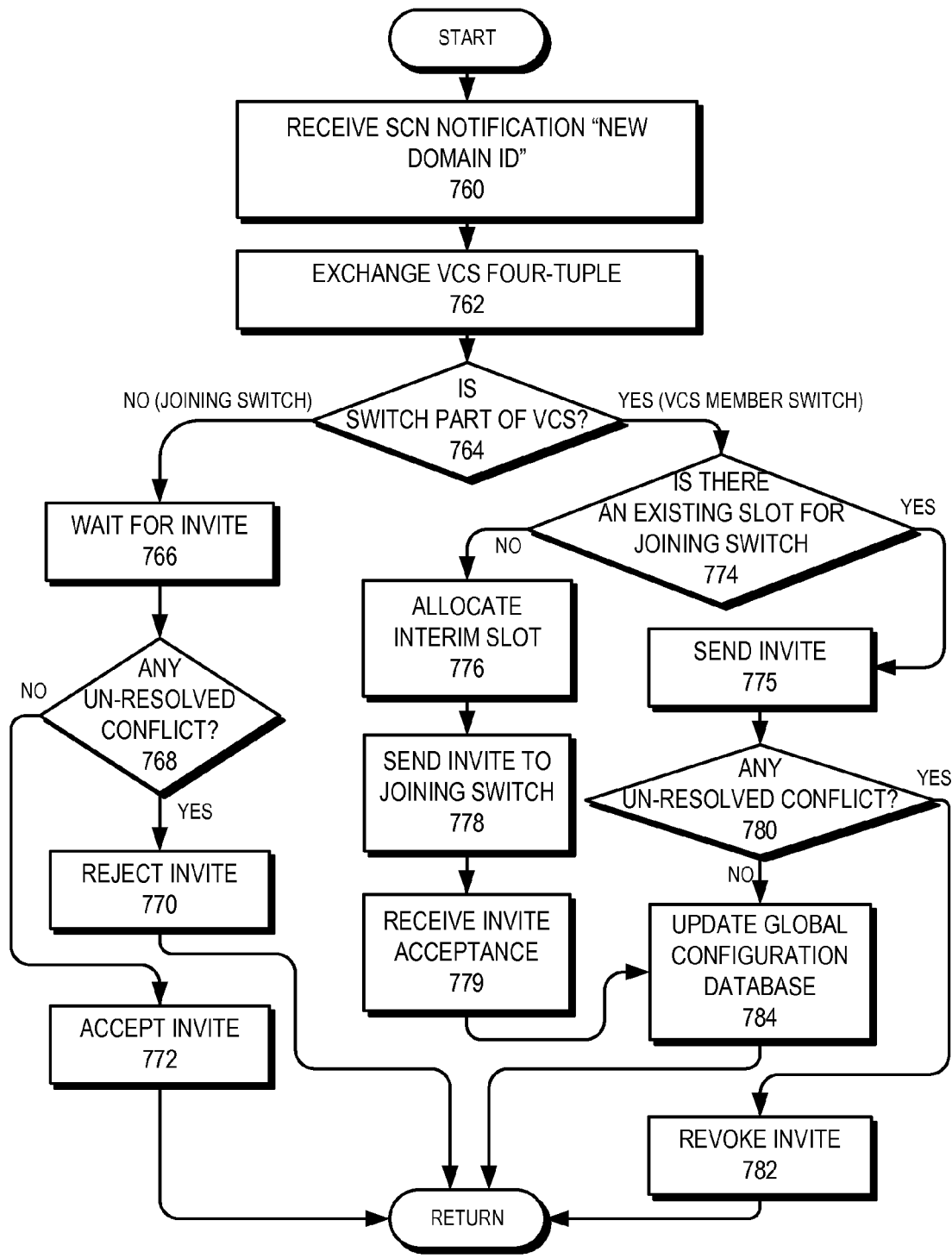
FIG. 7D presents a flowchart illustrating the general operation of a switch during a join process, in accordance with one embodiment of the present invention.

FIG. 7D presents a flowchart illustrating the general operation of a switch during a join process, in accordance with one embodiment of the present invention. This operation applies to both a joining switch and a neighboring VCS member switch. At the beginning of a join process, the logical FC switch within a switch receives an SCN notification on a newly detected switch domain ID on a link (operation 760). The system then exchanges the VCS four-tuple with the neighbor switch (operation 762). Subsequently, the system determines whether itself is part of a VCS (i.e., whether its IN_VCS=1) (operation 764). If the system is not part of a VCS (which means the local switch is attempting to join a VCS), the system then waits for an INVITE from the neighbor member switch (operation 766). After the INVITE is received, the system determines whether the configuration information in the INVITE causes any un-resolved conflict with the local switch (operation 768). If there is an un-resolved conflict, the system rejects the INVITE (operation 770). Otherwise, the system accepts the INVITE (operation 772).

If the system determines that itself is already part of a VCS (i.e., its IN_VCS=1) (operation 764), the system then further determines whether there is an existing slot in the global configuration database with the same mappedID as the joining switch (operation 774). If such a slot exists, the system then sends the INVITE to the joining switch (operation 775) and determines whether there is any un-resolved conflict between the configuration information stored in this slot and the information provided by the joining switch (operation 780). If so, the system revokes the INVITE (operation 782). Otherwise, the system updates the global configuration database with the joining switch's configuration information and propagates the update to all other member switches (operation 784).

If there is no slot in the global configuration database with the same mappedID as the joining switch (operation 774), the system allocates an interim slot in the global configuration database (operation 776), and sends an INVITE to the joining switch (operation 778). After receiving an INVITE acceptance from the joining switch (operation 779), the system then updates the global configuration database (operation 784) and completes the join process.

Layer-2 Services in VCS

In one embodiment, each VCS switch unit performs source MAC address learning, similar to what an Ethernet bridge does. Each {MAC address, VLAN} tuple learned on a physical port on a VCS switch unit is registered into the local Fibre Channel Name Server (FC-NS) via a logical Nx_Port interface corresponding to that physical port. This registration binds the address learned to the specific interface identified by the Nx_Port. Each FC-NS instance on each VCS switch unit coordinates and distributes all locally learned {MAC addresses, VLAN} tuple with every other FC-NS instance in the fabric. This feature allows the dissemination of locally learned {MAC addresses, VLAN} information to every switch in the VCS. In one embodiment, the learned MAC addresses are aged locally by individual switches.

Figure 8:
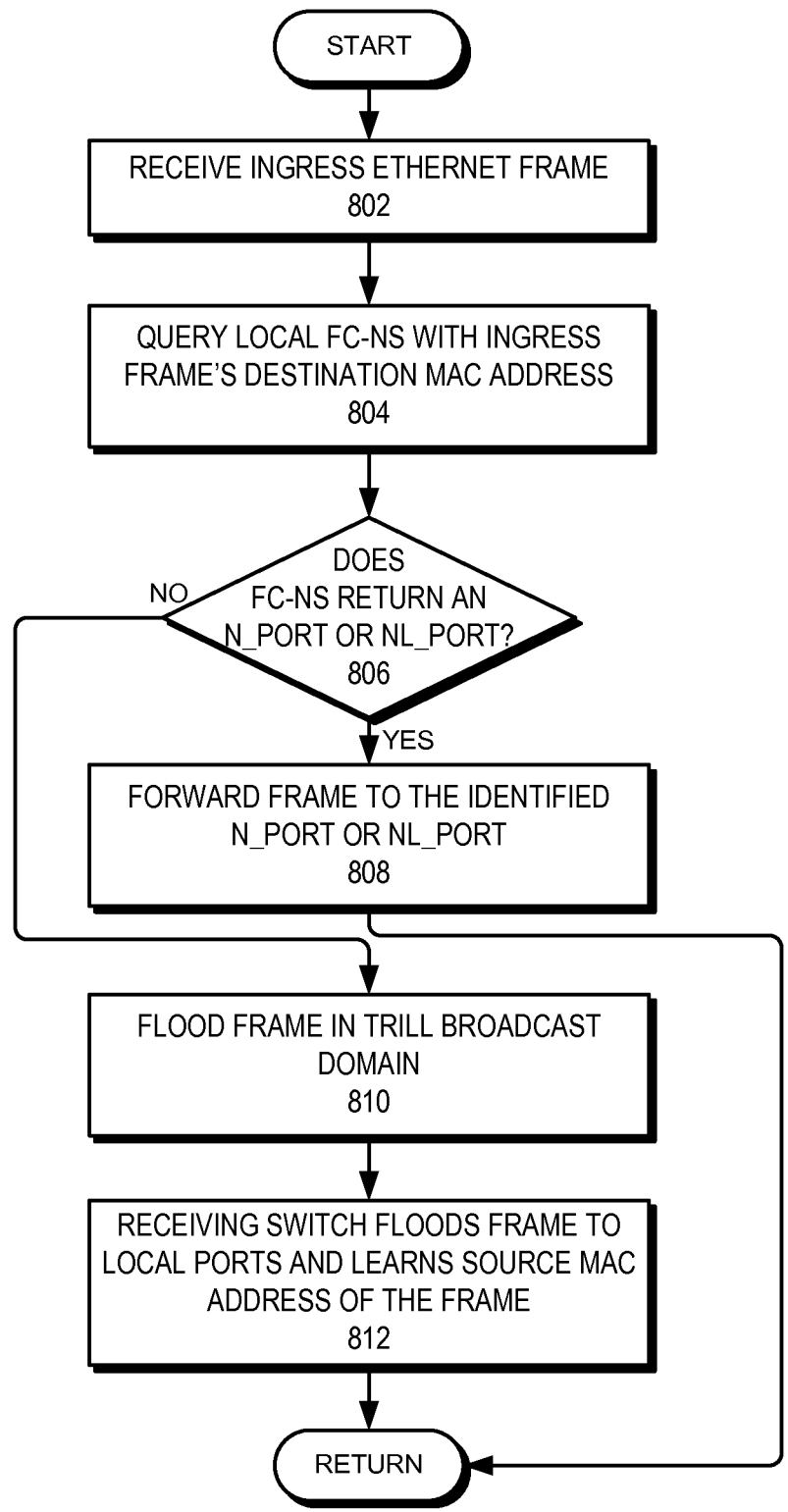
FIG. 8 presents a flowchart illustrating the process of looking up an ingress frame's destination MAC address and forwarding the frame in a VCS, in accordance with one embodiment of the present invention.

FIG. 8 presents a flowchart illustrating the process of looking up an ingress frame's destination MAC address and forwarding the frame in a VCS, in accordance with one embodiment of the present invention. During operation, a VCS switch receives an Ethernet frame at one of its Ethernet ports (operation 802). The switch then extracts the frame's destination MAC address and queries the local FC Name Server (operation 804). Next, the switch determines whether the FC-NS returns an N_Port or an NL_Port identifier that corresponds to an egress Ethernet port (operation 806).

If the FC-NS returns a valid result, the switch forwards the frame to the identified N_Port or NL_Port (operation 808). Otherwise, the switch floods the frame on the TRILL multicast tree as well as on all the N_Ports and NL_Ports that participate in that VLAN (operation 810). This flood/broadcast operation is similar to the broadcast process in a conventional TRILL RBridge, wherein all the physical switches in the VCS will receive and process this frame, and learn the source address corresponding to the ingress RBridge. In addition, each receiving switch floods the frame to its local ports that participate in the frame's VLAN (operation 812). Note that the above operations are based on the presumption that there is a one-to-one mapping between a switch's TRILL identifier (or nickname) and its FC switch domain ID. There is also a one-to-one mapping between a physical Ethernet port on a switch and the corresponding logical FC port.

End-to-End Frame Delivery and Exemplary VCS Member Switch

Figure 9:
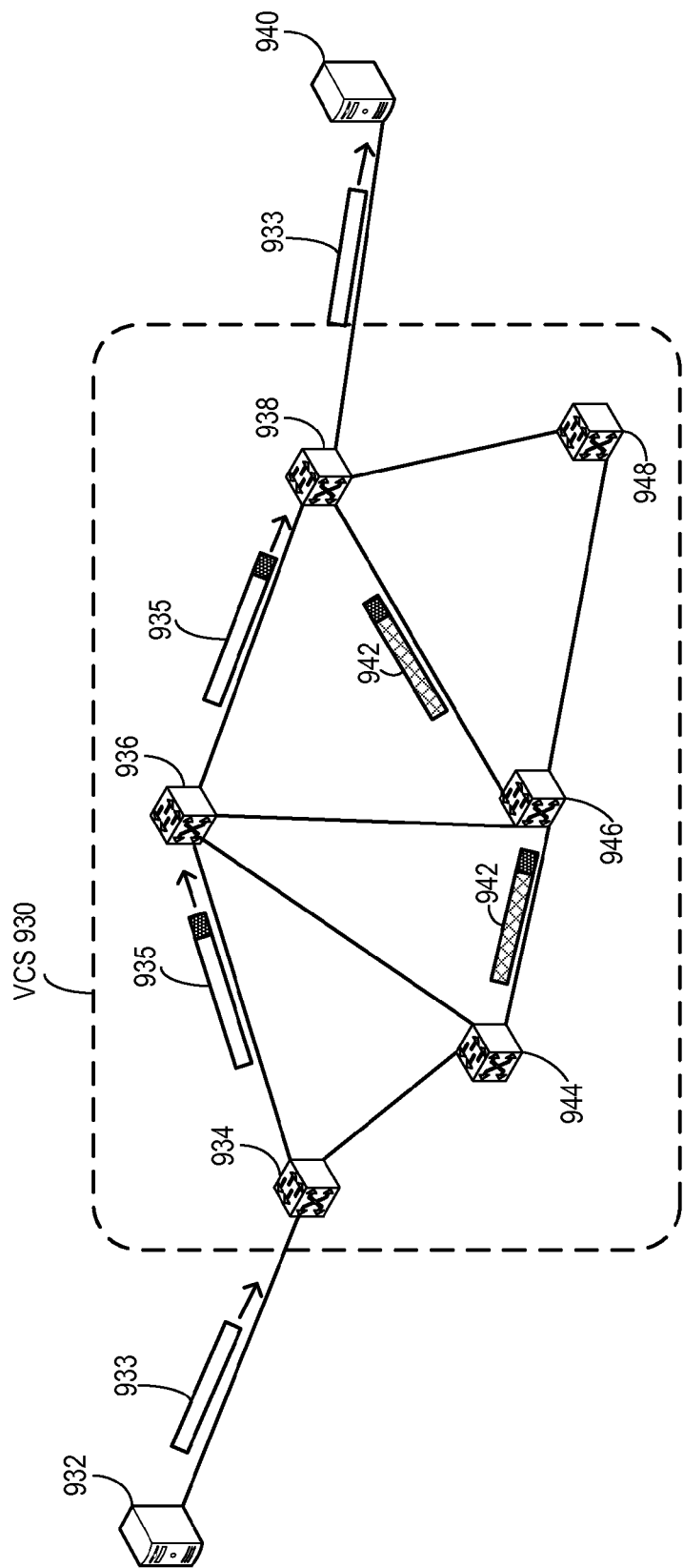
FIG. 9 illustrates how data frames and control frames are transported through a VCS, in accordance with one embodiment of the present invention.

FIG. 9 illustrates how data frames and control frames are transported in a VCS, in accordance with an embodiment of the present invention. In this example, a VCS 930 includes member switches 934, 936, 938, 944, 946, and 948. An end host 932 is communicating with an end host 940. Switch 934 is the ingress VCS member switch corresponding to host 932, and switch 938 is the egress VCS member switch corresponding to host 938. During operation, host 932 sends an Ethernet frame 933 to host 940. Ethernet frame 933 is first encountered by ingress switch 934. Upon receiving frame 933, switch 934 first extracts frame 933's destination MAC address. Switch 934 then performs a MAC address lookup using the Ethernet name service, which provides the egress switch identifier (i.e., the RBridge identifier of egress switch 938). Based on the egress switch identifier, the logical FC switch in switch 934 performs a routing table lookup to determine the next-hop switch, which is switch 936, and the corresponding output port for forwarding frame 933. The egress switch identifier is then used to generate a TRILL header (which specifies the destination switch's RBridge identifier), and the next-hop switch information is used to generate an outer Ethernet header. Subsequently, switch 934 encapsulates frame 933 with the proper TRILL header and outer Ethernet header, and sends the encapsulated frame 935 to switch 936. Based on the destination RBridge identifier in the TRILL header of frame 935, switch 936 performs a routing table lookup and determines the next hop. Based on the next-hop information, switch 936 updates frame 935's outer Ethernet header and forwards frame 935 to egress switch 938.

Upon receiving frame 935, switch 938 determines that it is the destination RBridge based on frame 935's TRILL header. Correspondingly, switch 938 strips frame 935 of its outer Ethernet header and TRILL header, and inspects the destination MAC address of its inner Ethernet header. Switch 938 then performs a MAC address lookup and determines the correct output port leading to host 940. Subsequently, the original Ethernet frame 933 is transmitted to host 940.

As described above, the logical FC switches within the physical VCS member switches may send control frames to one another (for example, to update the VCS global configuration database or to notify other switches of the learned MAC addresses). In one embodiment, such control frames can be FC control frames encapsulated in a TRILL header and an outer Ethernet header. For example, if the logical FC switch in switch 944 is in communication with the logical FC switch in switch 938, switch 944 can sends a TRILL-encapsulated FC control frame 942 to switch 946. Switch 946 can forward frame 942 just like a regular data frame, since switch 946 is not concerned with the payload in frame 942.

Figure 10:
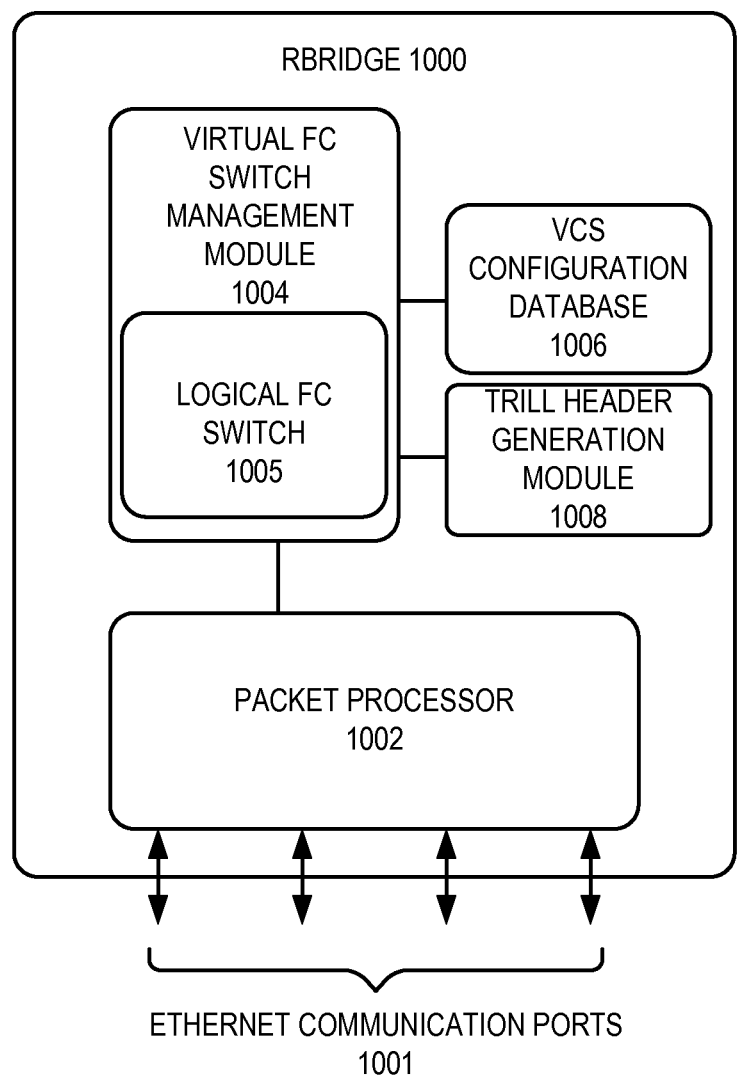
FIG. 10 illustrates an exemplary switch that facilitates formation of a virtual cluster switch, in accordance with an embodiment of the present invention.

FIG. 10 illustrates an exemplary VCS member switch, in accordance with one embodiment of the present invention. In this example, the VCS member switch is a TRILL RBridge 1000 running special VCS software. RBridge 1000 includes a number of Ethernet communication ports 1001, which can transmit and receive Ethernet frames and/or TRILL encapsulated frames. Also included in RBridge 1000 is a packet processor 1002, a virtual FC switch management module 1004, a logical FC switch 1005, a VCS configuration database 1006, and a TRILL header generation module 1008.

During operation, packet processor 1002 extracts the source and destination MAC addresses of incoming frames, and attaches property Ethernet or TRILL headers to outgoing frames. Virtual FC switch management module 1004 maintains the state of logical FC switch 1005, which is used to join other VCS switches using the FC switch fabric protocols. Virtual FC switch management module 1004 also performs the switch join and merge functions described above. VCS configuration database 1006 maintains the configuration state of every switch within the VCS. TRILL header generation module 1008 is responsible for generating property TRILL headers for frames that are to be transmitted to other VCS member switches.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   control circuitry configured to:
      maintain membership in a network of interconnected switches, wherein the network of interconnected switches is identified by a fabric identifier; and
      store in a storage device a set of configuration information for the network of interconnected switches; and
      obtain a switch index for the switch, wherein the switch index indicates a slot reserved for the switch in the set of configuration information, wherein the slot is persistent for the switch in a respective member of the network of interconnected switches;
   wherein the set of configuration information includes global configuration information associated with the network of interconnected switches and switch-specific configuration information associated with a respective member switch of the network of interconnected switches, wherein the global configuration information comprises the fabric identifier and a list comprising a respective virtual local area network (VLAN) associated with the network of interconnected switches, and wherein the switch-specific configuration information for the switch is stored in the slot.

2. The switch of claim 1,
   wherein the control circuitry is further configured to construct a notification message for other member switches in the network of interconnected switches, wherein a payload of the notification message comprises a media access control (MAC) address learned via one of the one or more ports.

3. The switch of claim 1, wherein a respective switch of the network of interconnected switches is associated with the fabric identifier; and
wherein the global configuration information further includes one or more of:
a switch identifier corresponding to a member switch; and
a switch identifier corresponding to a principal switch.

4. The switch of claim 1, wherein the switch-specific configuration information for the switch includes one or more of:
configuration information associated with the one or more ports of the switch;
an indication of where the switch is part of the network of interconnected switches;
an indication of whether the switch is a principal switch in the network of interconnected switches;
a switch identifier for the switch;
the switch index, wherein the switch index is unique for the switch; and
an Internet Protocol (IP) address assigned to the switch.

5. The switch of claim 1, wherein the switch is assigned an IP address, wherein the IP address is derived from a switch identifier assigned to the switch.

6. The switch of claim 1, wherein a port of the one or more ports is assigned a media access control (MAC) address, wherein the MAC address is derived based on an organizationally unique identifier of the port and a switch identifier assigned to the switch.

7. A method, comprising:
maintaining, for a switch, membership in a network of interconnected switches, wherein the network of interconnected switches is identified by a fabric identifier; and
storing in a storage device of the switch a set of configuration information for the network of interconnected switches; and
obtaining a switch index for the switch, wherein the switch index indicates a slot reserved for the switch in the set of configuration information, wherein the slot is persistent for the switch in a respective member of the network of interconnected switches;
wherein the set of configuration information includes global configuration information associated with the network of interconnected switches and switch-specific configuration information associated with a respective member switch of the network of interconnected switches, wherein the global configuration information comprises the fabric identifier and a list comprising a respective virtual local area network (VLAN) associated with the network of interconnected switches, and wherein the switch-specific configuration information for the switch is stored in the slot.

8. The method of claim 7, further comprising constructing a notification message for member switches in the network of interconnected switches other than the switch, wherein a payload of the notification message comprises a media access control (MAC) address learned via a port of the switch.

9. The method of claim 7, further comprising:
identifying an update to the set of configuration information; and
confirming whether the update is valid with respect to a second set of configuration information; and based on the confirmation, constructing, for member switches of the network of interconnected switches other than the switch, a message comprising the update.

10. The method of claim 7, wherein a respective switch of the network of interconnected switches is associated with the fabric identifier; and
wherein the global configuration information further includes one or more of:
a switch identifier corresponding to a member switch; and
a switch identifier corresponding to a principal switch.

11. The method of claim 7, wherein the switch-specific configuration information for the switch includes one or more of:
configuration information associated with the one or more ports of the switch;
an indication of where the switch is part of the network of interconnected switches;
an indication of whether the switch is a principal switch in the network of interconnected switches;
a switch identifier for the switch;
the switch index, wherein the switch index is unique and persistent for the switch; and
an Internet Protocol (IP) address assigned to the switch.

12. The method of claim 7, further comprising assigning an IP address to the switch, wherein the IP address is derived from a switch identifier assigned to the switch.

13. The method of claim 7, further comprising assigning a media access control (MAC) address to a port of the switch, wherein the MAC address is derived based on an organizationally unique identifier of the port and a switch identifier assigned to the switch.

14. A fabric switch, comprising:
a plurality of member switches; and
control circuitry residing on a respective member switch;
wherein the control circuitry residing on a first member switch configured to:
maintain membership in the fabric switch, wherein the fabric switch is identified by a fabric identifier; and
store a set of configuration information of the fabric switch; and
obtain a first switch index for the first switch, wherein the first switch index indicates a first slot reserved for the first switch in the set of configuration information, wherein the first slot is persistent for the first switch in a respective member of the fabric switch;
wherein the set of configuration information is replicated and stored in a storage device of a respective member switch of the fabric switch; and
wherein the set of configuration information includes global configuration information associated with the fabric switch and switch-specific configuration information associated with a respective member switch of the fabric switch, wherein the global configuration information comprises the fabric identifier and a list comprising a respective virtual local area network (VLAN) associated with the fabric switch, and wherein the switch-specific configuration information for the first switch is stored in the first slot.

15. The fabric switch of claim 14, wherein the control circuitry of the first switch is further configured to:
identify an update to a local copy of the set of configuration information;
confirm whether the update is valid with respect to a second set of configuration information from a second switch of the fabric switch; and
based on the confirmation, construct a message comprising the update for other switches of the fabric switch.

16. The fabric switch of claim 14,
wherein the control circuitry of the first switch is further configured to, in response to the first switch being a member switch of the fabric switch, update the list of VLANs in a local copy of the set of configuration information based on a second list of VLANs in a second set of configuration information from a second switch of the fabric switch.

17. The fabric switch of claim 14, wherein a respective switch of the fabric switch is associated with the fabric identifier; and
wherein the global configuration information further includes one or more of:
a switch identifier corresponding to a member switch; and
a switch identifier corresponding to a principal switch.

18. The fabric switch of claim 14, wherein the switch-specific configuration information for the first switch includes one or more of:
configuration information associated with one or more ports of the first switch;
an indication of where the first switch is part of the fabric switch;
an indication of whether the first switch is a principal switch in the fabric switch;
a switch identifier for the first switch;
the switch index, wherein the switch index in unique and persistent for the first switch; and
an IP address assigned to the first switch.

19. A switch means, comprising:
a control means for:
maintaining membership in a network of interconnected switches, wherein the network of interconnected switches is identified by a fabric identifier; and
storing in a storage device means a set of configuration information for a network of interconnected switch means; and
obtaining a switch index for the switch means, wherein the switch index indicates a slot reserved for the switch means in the set of configuration information, wherein the slot is persistent for the switch means in a respective member of the network of interconnected switch means;
wherein the set of configuration information includes global configuration information associated with the network of interconnected switch means and switch-means-specific configuration information associated with a respective member switch means of the network of interconnected switch means, wherein the global configuration information comprises the fabric identifier and a list comprising a respective virtual local area network (VLAN) associated with the network of interconnected switch means, and wherein the switch-means-specific configuration information for the switch means is stored in the slot.

20. A switch system means, comprising:
a plurality of switch means; and
a control means residing on a respective switch means;
wherein the control means residing on a first switch means for:
maintaining membership in the switch system means, wherein the switch system means is identified by a fabric identifier; and
storing a copy of configuration information of the switch system means; and
obtaining a first switch index for the first switch means, wherein the first switch index indicates a first slot reserved for the first switch means in the set of configuration information, wherein the first slot is persistent for the first switch means in a respective member of the switch system means;
wherein the set of configuration information includes global configuration information associated with the switch system means and switch-means-specific configuration information associated with a respective switch means of switch system means, wherein the global configuration information comprises the fabric identifier and a list comprising a respective virtual local area network (VLAN) associated with the switch system means, and wherein the switch-means-specific configuration information for the first member switch means is stored in the first slot.

* * * * *